United States Patent
Wang

(10) Patent No.: US 12,028,888 B2
(45) Date of Patent: Jul. 2, 2024

(54) TRANSMITTING HYBRID AUTOMATIC REPEAT REQUEST ACKNOWLEDGEMENT IN NEXT GENERATION NETWORKS

(71) Applicant: FG Innovation Company Limited, Tuen Mun (HK)

(72) Inventor: Hai-Han Wang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 300 days.

(21) Appl. No.: 17/508,987

(22) Filed: Oct. 23, 2021

(65) Prior Publication Data
US 2023/0126768 A1 Apr. 27, 2023

Related U.S. Application Data

(60) Provisional application No. 63/104,915, filed on Oct. 23, 2020.

(51) Int. Cl.
*H04W 72/542* (2023.01)
*H04L 1/1607* (2023.01)
(Continued)

(52) U.S. Cl.
CPC ......... *H04W 72/542* (2023.01); *H04L 1/1678* (2013.01); *H04L 5/0055* (2013.01); *H04W 72/0446* (2013.01); *H04W 72/23* (2023.01)

(58) Field of Classification Search
CPC ........... H04W 72/542; H04W 72/0446; H04W 72/23; H04W 72/11; H04W 72/1273; H04L 1/1678; H04L 5/0055
USPC ....................................................... 370/336
See application file for complete search history.

(56) References Cited

U.S. PATENT DOCUMENTS

2018/0331792 A1 11/2018 Yang et al.
2020/0214006 A1 7/2020 Choi et al.
(Continued)

FOREIGN PATENT DOCUMENTS

CN 111262670 6/2020
CN 111601384 8/2020

OTHER PUBLICATIONS

CMCC, "Discussion on DL SPS enhancements", R1-1912541, Nov. 18-22, 2019. (From Applicant's IDS) (Year: 2019).*
(Continued)

*Primary Examiner* — Mang Hang Yeung
(74) *Attorney, Agent, or Firm* — ScienBiziP, P.C.

(57) ABSTRACT

A method for transmitting a HARQ-ACK by a UE is provided. The method receives an SPS configuration. The method then receives a DCI format which activates the SPS configuration and also indicates a first offset for transmitting the HARQ-ACK. After receiving an SPS PDSCH associated with the SPS configuration in a first slot, the method identifies a second slot based on the first slot and the first offset for transmitting the HARQ-ACK. The method determines whether a first PUCCH for transmitting the HARQ-ACK is contained within uplink/flexible symbols of the second slot. When the first PUCCH is not contained within the uplink/flexible symbols and also a parameter that is included in the SPS configuration indicates a deferred HARQ transmission, the method identifies a third slot based on the first slot and a second offset and transmits the HARQ-ACK on a second PUCCH in the third slot.

12 Claims, 7 Drawing Sheets

(51) Int. Cl.
  *H04L 5/00*   (2006.01)
  *H04W 72/0446*   (2023.01)
  *H04W 72/23*   (2023.01)

(56) References Cited

U.S. PATENT DOCUMENTS

| | | | | |
|---|---|---|---|---|
| 2022/0124775 A1* | 4/2022 | Zhang | .................. | H04W 72/21 |
| 2022/0337356 A1* | 10/2022 | Dimou | .................. | H04L 1/1822 |
| 2022/0361208 A1* | 11/2022 | Khoshnevisan | ...... | H04W 72/21 |
| 2023/0112147 A1* | 4/2023 | Chien | .................. | H04L 1/1861 |
| | | | | 370/329 |

OTHER PUBLICATIONS

TCL Communication, UE feedback enhancements for HARQ-ACK, R1-2102922, Apr. 12-20, 2021. (From Applicant's IDS) (Year: 2021).*

3GPP TS 38.214, "3rd Generation Partnership Project; Technical Specification Group Radio Access Network; NR; Physical layer procedures for data (Release 16)", V16.3.0 (Sep. 2020).

3GPP TS 38.213, "3rd Generation Partnership Project; Technical Specification Group Radio Access Network; NR; Physical layer procedures for control (Release 15)", V15.3.0 (Sep. 2018).

TCL Communication, UE feedback enhancements for HARQ-ACK, 3GPP TSG RAN WG1 Meeting #104bis-e, e-Meeting, Apr. 12-20, 2021, R1-2102922, sections 2-3.

CMCC, Discussion on DL SPS enhancements, 3GPP TSG RAN WG1 #99, Reno, USA, Nov. 18-22, 2019, R1-1912541, sections 2-3.

* cited by examiner

TRANSMITTING HYBRID AUTOMATIC REPEAT REQUEST ACKNOWLEDGEMENT IN NEXT GENERATION NETWORKS

CROSS-REFERENCE TO RELATED APPLICATION(S)

The present application claims the benefit of and priority to U.S. Provisional Patent Application Ser. No. 63/104,915, filed on Oct. 23, 2020, entitled "SPS HARQ-ACK TRANSMISSION ENHANCEMENTS," the content of which is hereby incorporated fully by reference herein into the present disclosure.

FIELD

The present disclosure generally relates to wireless communications, and more particularly, to the transmission of hybrid automatic repeat request (HARQ)-acknowledgement (ACK) (HARQ-ACK) by a user equipment (UE).

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

In the third Generation Partnership Project (3GPP), Rel-15, one semi-persistent scheduling (SPS) configuration may be configured in a cell group to support periodic traffic, such as voice over IP (VoIP), in NR. In Rel-16, supporting time sensitive networking (TSN) in NR use cases is one of the important goals. In order to simultaneously support multiple TSN flows, multiple semi-persistent scheduling (SPS) configurations in a bandwidth part (BWP) for a user equipment (UE) may be necessary to reduce signaling overhead of physical downlink control channels (PDCCHs). In addition, the smallest periodicity of an SPS configuration may be reduced (e.g., to one slot) to better support TSN flows with shorter periodicities.

For reporting a hybrid automatic repeat request acknowledgement (HARQ-ACK) for an SPS physical downlink shared channel (PDSCH) of multiple SPS configurations on a physical uplink control channel (PUCCH) configured for an SPS HARQ-ACK, multiple PUCCH resources may be configured by an SPS-PUCCH-AN-List per HARQ-ACK codebook. The actual PUCCH resource to be used among PUCCH resources may be determined based on a size of a HARQ-ACK payload. In such implementations, a HARQ-ACK bit order for SPS PDSCH reception without a corresponding PDCCH may be determined in an ascending order of a downlink (DL) slot per {SPS configuration index, serving cell index}, and further in an ascending order of an SPS configuration index per {serving cell index}, and/or further in an ascending order of a serving cell index.

With regards to industrial internet of things (IIoT) or TSN use cases, traffic with low latency requirement and low periodicity may be transmitted using SPS PDSCHs. Since the periodicity of an SPS configuration may be as small as one slot, many configured PUCCH resources for SPS PDSCH receptions may not be transmitted (e.g., may be dropped), for example, when operating in an unpaired spectrum with longer DL-to-UL and/or UL-to-DL switching periods, which may affect the reliability and latency of the traffic. Thus, there is room in the next generation networks to define new methods that enable the transmission of such HARQ-ACKs in other (e.g., deferred) PUCCHs.

SUMMARY

As discussed above, the present disclosure is directed to a method for managing a UE's behavior in HARQ-ACK transmissions associated with an SPS PDSCH, which may include deferring the SPS HARQ-ACK feedback (e.g., to the later slots of a PUCCH resource), constructing HARQ-ACK codebook(s), and multiplexing PUCCH for an SPS HARQ-ACK and other PUCCHs or PUSCHs.

In a first aspect of the present disclosure, a method for transmitting a HARQ-ACK by a UE is provided. The method receives an SPS configuration. The method receives a DCI format indicating activation of the SPS configuration. The DCI format further indicates a first offset for transmitting the HARQ-ACK. The method receives an SPS PDSCH associated with the SPS configuration in a first slot. The method identifies a second slot based on the first slot and the first offset for transmitting the HARQ-ACK on a first PUCCH corresponding to the SPS PDSCH. The method determines whether the first PUCCH is contained within one or more symbols in the second slot that are either uplink symbols or flexible symbols. When the first PUCCH is not contained within the one or more symbols and a particular parameter included in the SPS configuration indicates a deferred HARQ transmission, the method identifies a third slot based on the first slot and a second offset for transmitting the HARQ-ACK on a second PUCCH corresponding to the SPS PDSCH. The second offset is greater than the first offset and the second PUCCH is contained within one or more symbols in the third slot that are either uplink symbols or flexible symbols. The method further transmits the HARQ-ACK on the second PUCCH in the third slot. The method further drops the HARQ-ACK when the first PUCCH is not contained within the one or more symbols and the particular parameter does not indicate the deferred HARQ transmission.

In an implementation of the first aspect, the one or more symbols in the third slot are either semi static uplink symbols or semi static flexible symbols.

In another implementation of the first aspect, the method further receives the SPS configuration via radio resource control (RRC) signaling.

In another implementation of the first aspect, the second offset is less than a maximum value that is included in the SPS configuration.

In another implementation of the first aspect, the method further transmits the HARQ-ACK on the first PUCCH in the second slot irrespective of the particular parameter indicating the deferred HARQ transmission or not when the first PUCCH is contained within the one or more symbols.

In another implementation of the first aspect, the second offset is determined based on identifying a particular slot earliest in time between the second slot and a maximum slot. The particular slot includes enough number of uplink or flexible symbols for carrying the second PUCCH.

In another implementation of the first aspect, the method further receives a second SPS configuration. The method further receives a second DCI format activating the second SPS configuration. The second DCI format further indicates a third offset for transmitting a second HARQ-ACK. The method further receives a second SPS PDSCH associated with the second SPS configuration in a fourth slot. The method further transmits, instead of the HARQ-ACK on the second PUCCH in the third slot, the HARQ-ACK and the second HARQ-ACK on a third PUCCH corresponding to the SPS PDSCH and the second SPS PDSCH in the third slot when the third slot that was previously identified for transmitting the HARQ-ACK is also identified based on the fourth slot and the third offset for transmitting the second HARQ-ACK. The third PUCCH is determined based on a payload size of the second HARQ-ACK and a payload size of the HARQ-ACK.

In a second aspect, a UE is provided. The UE includes one or more non-transitory computer-readable media storing computer-executable instructions for transmitting a HARQ-ACK. The UE also includes at least one processor coupled to the one or more non-transitory computer-readable media, and configured to execute the computer-executable instructions to receive an SPS configuration. The UE is further configured to receive a DCI format indicating activation of the SPS configuration. The DCI format further indicates a first offset for transmitting the HARQ-ACK. The UE is further configured to receive an SPS PDSCH associated with the SPS configuration, in a first slot. The UE is further configured to identify a second slot based on the first slot and the first offset for transmitting the HARQ-ACK on a first PUCCH corresponding to the SPS PDSCH. The UE is further configured to determine whether the first PUCCH is contained within one or more symbols in the second slot that are either uplink symbols or flexible symbols. The UE is further configured to identify a third slot based on the first slot and a second offset for transmitting the HARQ-ACK on a second PUCCH corresponding to the SPS PDSCH, and transmit the HARQ-ACK on the second PUCCH in the third slot when the first PUCCH is not contained within the one or more symbols and a particular parameter included in the SPS configuration indicates a deferred HARQ transmission. The second offset is greater than the first offset and the second PUCCH is contained within one or more symbols in the third slot that are either uplink symbols or flexible symbols. The UE is further configured to drop the HARQ-ACK when the first PUCCH is not contained within the one or more symbols and the particular parameter does not indicate the deferred HARQ transmission.

In an implementation of the second aspect, the one or more symbols in the third slot are either semi static uplink symbols or semi static flexible symbols.

In another implementation of the second aspect, the at least one processor is further configured to execute the computer-executable instructions to receive the SPS configuration via RRC signaling.

In another implementation of the second aspect, the second offset is less than a maximum value that is included in the SPS configuration.

In another implementation of the second aspect, the at least one processor is further configured to execute the computer-executable instructions to transmit the HARQ-ACK on the first PUCCH in the second slot irrespective of the particular parameter indicating the deferred HARQ transmission or not when the first PUCCH is contained within the one or more symbols.

In another implementation of the second aspect, the second offset is determined based on identifying a particular slot earliest in time between the second slot and a maximum slot. The particular slot includes enough number of uplink or flexible symbols for carrying the second PUCCH.

In another implementation of the second aspect, the at least one processor is further configured to execute the computer-executable instructions to receive a second SPS configuration. The UE, including the at least one processor, is further configured to receive a second DCI format activating the second SPS configuration, the second DCI format further indicating a third offset for transmitting a second HARQ-ACK. The UE is further configured to receive a second SPS PDSCH associated with the second SPS configuration in a fourth slot. The UE is further configured to transmit, instead of the HARQ-ACK on the second PUCCH in the third slot, the HARQ-ACK and the second HARQ-ACK on a third PUCCH corresponding to the SPS PDSCH and the second SPS PDSCH in the third slot when the third slot that was previously identified for transmitting the HARQ-ACK is also identified based on the fourth slot and the third offset for transmitting the second HARQ-ACK. The third PUCCH is determined based on a payload size of the second HARQ-ACK and a payload size of the HARQ-ACK.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
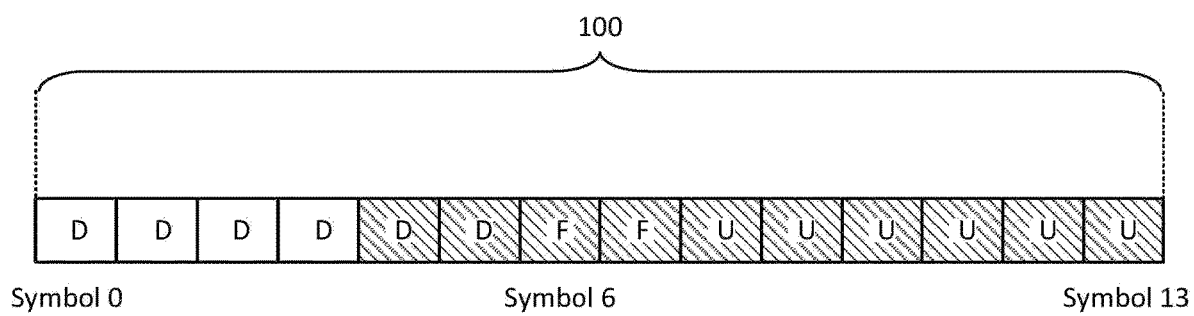
FIG. 1 is a schematic diagram illustrating a typical 5G NR frame structure, according to an example implementation of the present disclosure.

The acronyms in the present disclosure are defined as follows and unless otherwise specified, the acronyms have the following meanings:

| Acronym | Full name |
| --- | --- |
| 3GPP | $3^{rd}$ Generation Partnership Project |
| 5GC | 5G Core |
| ACK | Acknowledgement |

-continued

| Acronym | Full name |
|---|---|
| ARQ | Automatic Repeat Request |
| BA | Bandwidth Adaptation |
| BS | Base Station |
| BWP | Bandwidth Part |
| CA | Carrier Aggregation |
| CBG | Code Block Group |
| CBRA | Contention Based Random Access |
| CN | Core Network |
| CORESET | Control Resource Set |
| CSI | Channel State Information |
| DC | Dual Connectivity |
| DCI | Downlink Control Information |
| DL | Downlink |
| DRX | Discontinuous Reception |
| HARQ | Hybrid Automatic Repeat Request |
| IE | Information Element |
| MAC | Medium Access Control |
| MCG | Master Cell Group |
| MSG | Message |
| NG-RAN | Next-Generation Radio Access Network |
| NR | New Radio |
| NW | Network |
| PCell | Primary Cell |
| PDCCH | Physical Downlink Control Channel |
| PDSCH | Physical Downlink Shared Channel |
| PHY | Physical Layer |
| PRACH | Physical Random Access Channel |
| PUCCH | Physical Uplink Control Channel |
| PUSCH | Physical Uplink Shared Channel |
| RA | Random Access |
| RACH | Random Access Channel |
| RAN | Radio Access Network |
| RAR | Random Access Response |
| Rel | Release |
| RRC | Radio Resource Control |
| RRM | Radio Resource Management |
| SCell | Secondary Cell |
| SCG | Secondary Cell Group |
| SCS | Sub-Carrier Spacing |
| SI | System Information |
| SPS | Semi-Persistent Scheduling |
| SR | Scheduling Request |
| SSB | Synchronization Signal Block |
| TB | Transport Block |
| TS | Technical Specification |
| UCI | Uplink Control Information |
| UE | User Equipment |
| UL | Uplink |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in some implementations," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y", According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within, the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), lash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell. (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG, MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Furthermore, the term bandwidth part (BWP) may be a subset of a total cell bandwidth of a cell. BWP adaptation may be achieved by configuring a UE with BWP(s) and informing the UE which of the configured BWPs is/are currently the active one. In some implementations, in order to enable bandwidth adaptation (BA) on a PCell, a gNB may configure a UE with UL and DL BWP(s). In some such implementations, in order to enable the BA on SCells in case of a carrier aggregation (CA), a gNB may configure a UE with at least one DL BWP (e.g., there may be no BWP configured in a UL). In some implementations, for a PCell, an initial BWP may be the BWP used for initial access. In some implementations, for SCell(s), an initial BWP may be the BWP configured for a UE to first operate at an SCell activation. In some implementations, a UE may be configured with a first active uplink BWP by a firstActiveUplinkBWP information element (IE). In some implementations, if the first active UL BWP is configured for an SpCell, the firstActiveUplinkBWP IE field may contain the ID of the UL BWP to be activated upon performing an RRC configuration or an RRC reconfiguration. In some implementations, if the field is absent, the RRC configuration or the RRC reconfiguration may not impose a BWP switch. In some implementations, if the first active UL BWP is configured for an SCell, the firstActiveUplinkBWP IFE field may contain the ID of the UL BWP to be used upon a MAC-activation of an SCell.

As discussed above, the term HARQ-ACK may include the term hybrid automatic repeat request (HARQ) and the term acknowledgement/non-acknowledgement (ACK/NACK). The term HARQ may be a scheme that combines an automatic repeat request (ARQ) error control mechanism and a forward error correction (FEC) coding in which unsuccessful attempts are used in FEC decoding instead of being discarded. In some implementations, a HARQ-ACK feedback may be used to indicate whether a HARQ process is successfully performed.

Moreover, the term code block group (CBG) may refer to code blocks of a transport block (TB) grouped together. Each CBG may include the same or different number of code block(s). In some implementations, CBG-based retransmissions may be scheduled to carry a number of CBGs of a TB.

In some implementations, reporting a HARQ-ACK for an SPS PDSCH of multiple SPS configurations that is multiplexed with a HARQ-ACK corresponding to a dynamically scheduled PDSCH or an SPS release scheduled by a downlink control information (DCI), a PUCCH may be determined, for example, based on the DCI. In some implementations, the HARQ-ACK codebook used for an SPS configuration may be determined by a radio resource control (RRC) parameter configured in an SPS PDSCH configuration.

In some implementations, if a type-1 HARQ-ACK codebook is used for reporting a HARQ-ACK for SPS configurations, a HARQ-ACK bit location (e.g., a location within a HARQ-ACK codebook) for an SPS PDSCH may be derived based on a time domain resource allocation (TDRA) table row index and an offset (e.g., K1) indicated, for example, in the activation DCI. In some such implementations, the HARQ-ACK bit location for an SPS PDSCH release with a separate release DCI (e.g., DCI that releases one SPS configuration) may be derived based on the TDRA table row index indicated in the activation DCI and the offset K1 indicated in the release DCI. In some implementations, the HARQ-ACK bit location for the SPS PDSCH release with a joint release DCI may be derived based on the TDRA table row index indicated in the activation DCI for an SPS PDSCH with the lowest SPS configuration index among the jointly released configurations and the offset K1 indicated in the release DCI.

In some implementations, if a type-2 HARQ-ACK codebook is used for reporting a HARQ-ACK for SPS configurations, a HARQ-ACK bit order for an SPS PDSCH release with a separate/joint release DCI may be derived based on a downlink assignment index (DAI) and an offset (e.g., K1) indicated in the release DCI In some such implementations, a HARQ-ACK bit location within a HARQ-ACK codebook for an SPS PDSCH with an associated PDCCH may be derived based on the DAI and the offset (e.g., K1) indicated in an activation DCI. In some implementations, the HARQ-ACK bit(s) for an SPS PDSCH without a corresponding PDCCH may be appended after the HARQ-ACK bit(s) for the dynamically scheduled PDSCHs and/or for an SPS PDSCH release. In some implementations, the HARQ-ACK bit order may be determined in an ascending order of a DL slot per {SPS configuration index, serving cell index}, and further in an ascending order of an SPS configuration index per {serving cell index}, and/or further in an ascending order of a serving cell index.

In some implementations, a HARQ-ACK codebook for SPS HARQ-ACK bit(s) When transmitted in a PUCCH resource configured for transmission of only SPS HARQ-ACK bit(s) may also be referred as the Type-1 HARQ-ACK codebook. The Type-1 HARQ-ACK codebook hereon may also be referred to as the Type-1 HARQ-ACK codebook transmitted in a PUCCH resource scheduled by a DCI format (e.g., a DCI format 1_0, a DCI format 1_1, and a DCI format 1_2).

In Rel-16, a UE may be configured with two HARQ-ACK codebooks. In some implementations, if a UE is provided a pdsch-HARQ-ACK-Codebook-List, the UE may be indicated (e.g., by the pdsch-HARQ-ACK-Codebook-List) to generate one or more HARQ-ACK codebooks. In some implementations, if a UE is indicated to generate one HARQ-ACK codebook, the one HARQ-ACK codebook may be associated with a PUCCH of a priority index "0". In some implementations, if a UE is provided a pdsch-HARQ-ACK-Codebook-List, the UE may multiplex the same HARQ-ACK codebook with only HARQ-ACK information associated with the same priority index. In some implementations, if the UE is indicated to generate two HARQ-ACK codebooks, a first HARQ-ACK codebook may be associated with a PUCCH of a priority index "0" (e.g., low priority) and a second HARQ-ACK codebook may be associated with a PUCCH of priority index "1" (e.g., high priority), and the UE may provide each of {PUCCH-Config, UCI-OnPUSCH, PDSCH-codeBlockGroupTransmission} by {PUCCHConfigurationList, UCI-OnPUSCH-List, and PDSCH-CodeBlockGroupTransmission-List} for use with the first and second H-ARQ-ACK codebooks.

In some implementations, various methods may be implemented for determination of a PUCCH resource for the transmission of HARQ-ACK bit(s). In some implementations, if a UE transmits $O_{UCI}$ UCI information bits that include HARQ-ACK information bits, the UE may determine a PUCCH resource set to be one of the following four PUCCH resource sets: a first set of PUCCH resources with a pucch-ResourceSetId=0, and satisfying the following conditions: if $O_{UCI} \leq 2$ including 1 or 2 HARQ-ACK information bits, a positive or negative scheduling request (SR) on one SR transmission occasion if transmission of HARQ-ACK information and the SR occurs simultaneously; a second set of PUCCH resources with a pucch-ResourceSetId=1, and satisfying the following conditions: if provided by higher layers, if $2 < O_{UCI} \leq N_2$, and where $N_2$ equals to a maxPayloadSize if the maxPayloadSize is provided for the PUCCH resource set with the pucch-ResourceSetId=1, otherwise $N_2$ equals to 1706; a third set of PUCCH resources with a pucch-ResourceSetId=2, and satisfying the following conditions: if provided by higher layers, if $N_2 < O_{UCI} \leq N_3$, and where $N_3$ equals to a maxPayloadSize if the maxPayloadSize is provided for the PUCCH resource set with the pucch-ResourceSetId=2, otherwise $N_3$ equals to 1706; or a fourth set of PUCCH resources with a pucch-ResourceSetId=3, and satisfying the following conditions: if provided by higher layers, and if $N_3 < O_{UCI} \leq 1706$.

In some implementations, if a UE is provided with an SPS-PUCCH-AN-List and transmits $O_{UCI}$ UCI information bits that include only HARQ-ACK information bits in response to one or more SPS PDSCH receptions, the UE may determine a PUCCH resource to be one of the following four PUCCH resources: a PUCCH resource with an SPS-PUCCH-AN-ResourceID=0, and satisfying the following condition, if $O_{UCI} \leq 2$; a PUCCH resource with an SPS-PUCCH-AN-ResourceID=1, and satisfying the following conditions: if provided, if $2 < O_{UCI} \leq N_{1,SPS}$ where $N_{1,SPS}$ is either provided by a maxPayloadSize in an SPS-PUCCH-AN-List for the SPS-PUCCH-AN-ResourceID=1 or otherwise equals to 1706; a PUCCH resource with an SPS-PUCCH-AN-ResourceID=2, and satisfying the following conditions: if provided, if $N_{1,SPS} < O_{UCI} \leq N_{2,SPS}$ where $N_{2,SPS}$ is either provided by a maxPayloadSize in an SPS-PUCCH-AN-List for the SPS-PUCCH-AN-ResourceID=2 or otherwise equals to 1706; or a PUCCH resource with an SPS-PUCCH-AN-ResourceID=3, and satisfying the following conditions: if provided, if $N_{2,SPS} < O_{UCI} \leq N_{3,SPS}$ where $N_{3,SPS}$ equals to 1706.

In Rel-15 and Rel-16, with regards to an unpaired spectrum, when a subset of symbols containing a scheduled or a configured PUCCH transmission are semi-static DL symbols or are symbols containing synchronization signal block (SSB), the PUCCH may not be transmitted. In some implementations, 14 symbols may be in one or more slots, and directions (e.g., uplink or downlink) of each of the 14 symbols may be semi-statically configured by a slot configuration tdd-UL-DL-ConfigurationCommon or tdd-UL-DL-ConfigurationDedicated. FIG. 1 is a schematic diagram illustrating a typical 5G NR frame structure, according to an example implementation of the present disclosure. For example, a slot 100 may include 14 symbols (e.g., symbol 0 to symbol 13), each configured as a symbol (e.g., D, F, U), as illustrated in FIG. 1. Symbol 0 to symbol 5 may be configured with symbols indicated as downlink (DL) symbols (e.g., D), symbol 6 and symbol 7 may be configured with symbols indicated as flexible symbols (e.g., F), and symbol 8 to symbol 13 may be configured with symbols indicated as uplink (UL) symbols (e.g., U). If a PUCCH transmission is configured (e.g., patterned with slanted lines) in symbol 4 to symbol 13, as illustrated in FIG. 1, the PUCCH may not be transmitted since the PUCCH is contained in DL symbols (e.g., D), at least because symbol 4 and symbol 5 may be pre-configured with DL symbols (e.g., D). In other words, the PUCCH may collide with DL symbols (e.g., D), at least, in symbol 4 and symbol 5.

As described above, the present disclosure provides a UE and a method for management of the UE's behavior for the HARQ-ACK transmission associated with an SPS PDSCH, which may include deferring an SPS HARQ-ACK feedback, constructing HARQ-ACK codebook, and/or multiplexing the PUCCH for an SPS HARQ-ACK and other PUCCHs or PUSCHs.

In some implementations, deferring the SPS HARQ-ACK bit(s) to be transmitted in any slots after a slot in which a PUCCH resource for the SPS HARQ-ACK is initially configured may be beneficial for rescheduling of unsuccessfully received/decoded SPS PDSCHs. In some implementations, a UE may configure and/or indicate the PUCCH resource used for transmission of the deferred SPS HARQ-ACK bit(s).

In some implementations of the present disclosure, a UE may be provided with a PUCCH resource for transmission(s) of deferred HARQ-ACK bit(s) corresponding to the SPS PDSCH receptions. In some implementations, a slot may include a sub-slot if the UE is provided with a subslotLength-ForPUCCH, which may indicate a number of symbols of a sub-slot for an associated PUCCH transmission. To provide extra opportunities for transmission of, for example, a HARQ-ACK bit(s) that corresponds to an SPS PDSCH reception configured in a slot "n", a PUCCH resource in a slot "n+k+d" may be provided. An offset "k" may be a number of slots indicated by a PDSCH-to-HARQ_feedback timing indicator field in a corresponding DCI format used for activation of the SPS configuration of an SPS PDSCH reception or provided by an dl-DataToUL-ACK feedback if the PDSCH-to-HARQ_feedback timing indicator field is not present in the corresponding DCI format. Another offset "d" may be larger than or equal to 0 and may be determined based on one, or a combination, of the following implementations. In some such implementations, when the offset "d"=0, the SPS HARQ-ACK bit(s) may be regarded as a non-deferred SPS HARQ-ACK bit(s).

In some implementations, the offset "d" may be a value or multiple values chosen from a set of values. In some such implementations, a maximum value in the value set may be preconfigured or predefined and the set of values may include all integers less than or equal to the maximum value. In some implementations, a PUCCH resource for transmission of only SPS HARQ-ACK bit(s) in a slot may be selected from the PUCCH resource configured by an SPS-PUCCH-AN-List-r16 based on a total payload size of the deferred and the non-deferred SPS HARQ-ACK bits. An example of the method described above may be illustrated in FIG. 2.

Figure 2:
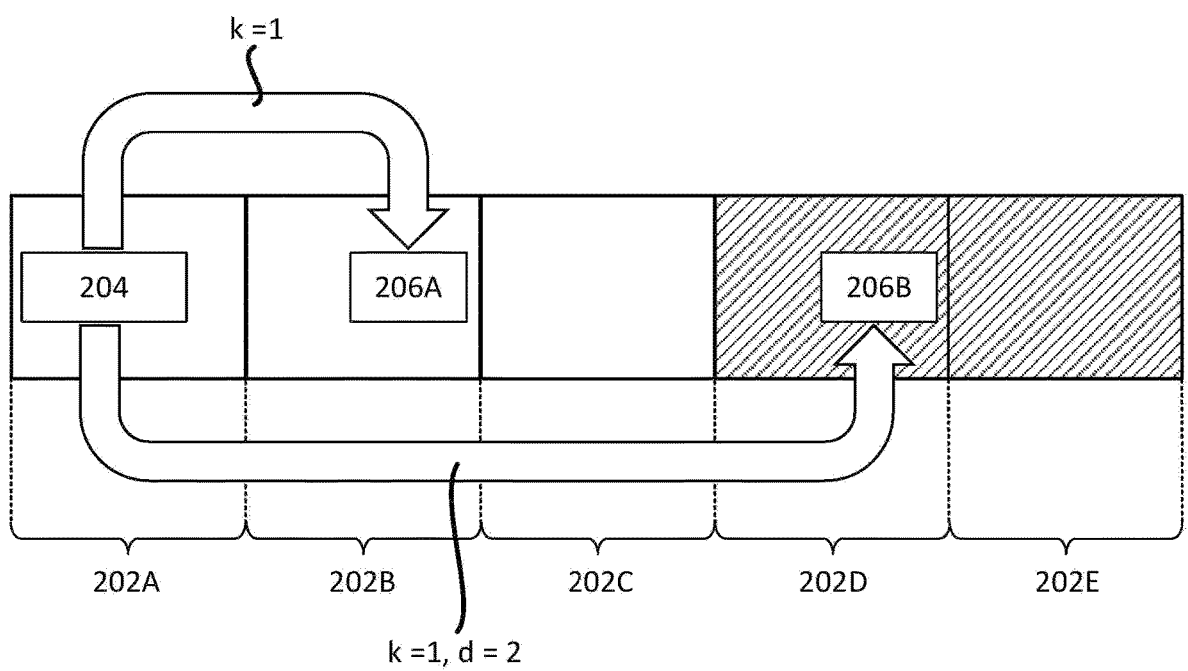
FIG. 2 is a schematic diagram illustrating deferring a HARQ-ACK transmission based on a PUCCH corresponding to an SPS PDSCH, according to an example implementation of the present disclosure.

FIG. 2 is a schematic diagram illustrating deferring a HARQ-ACK transmission based on a PUCCH corresponding to an SPS PDSCH, according to an example implementation of the present disclosure. In some implementations, example slots, as illustrated in FIG. 2, may include a slot 202A (e.g., slot 0), slot 202B (e.g., slot 1), a slot 202C (e.g., slot 2), a slot 202D (e.g., slot 3), and a slot 202E (e.g., slot 4). The slot 202A, slot 202B, and slot 202C may all be configured with one or more DL symbols (e.g., resulting in them becoming non-patterned slots) while the slot 202D and the slot 202E may be both configured with one or more UL symbols (e.g., resulting in them becoming patterned slots). An SPS PDSCH 204 may be transmitted in the slot 202A (e.g., a slot "n") and a PUCCH 206A for a HARQ-ACK corresponding to the SPS PDSCH 204 may be configured in the slot 202B based on an offset k=1 However, in some implementations, the PUCCH 206A configured in the slot 202B may not be transmittable to the base station, for example, as the PUCCH 206A collides with the DL symbol in the slot 202B (e.g., the PUCCH 206A configured in the non-patterned slot 202B or the slot 02B with a DL symbol).

In some such implementation, when the PUCCH 206A is not transmittable in the slot 202B (e.g., when the PUCCH collides with one or more DL symbols in the slot 202B), the UE may determine first whether a particular parameter (e.g., that is also included in the SPS configuration) indicates a deferral in the corresponding HARQ transmission (e.g., when a particular bit representing the parameter is set to one). When the particular parameter indicates deferral of the HARQ transmission, the UE may determine to configure another PUCCH 206B (e.g., corresponding to the same SPS PDSCH 204) in the slot 202D for transmission of the HARQ-ACK based on the offset k=1 and another offset d=2. In some implementations, the UE may determine the offset d, and may subsequently identify the slot 202D, as this slot is the earliest slot (in the time domain) between the slot 202B and a maximum slot (e.g., slot 202E) that includes enough number of uplink (and/or flexible) symbols for carrying the PUCCH 206B.

In some implementations, even though the PUCCH 206A configured in the slot 202B may collide with the DL symbol(s) in the slot 202B (e.g., the PUCCH 206A configured in the non-patterned slot 202B or the slot 202B with a DL symbol), if the particular parameter (e.g., included in the SPS configuration) does not indicate a deferred HARQ transmission (e.g., when the particular bit representing the parameter is set to zero), the UE may determine to drop the HARQ-ACK, for example, instead of transmitting the PUCCH 206A in the first available uplink slot.

In some implementations of the present disclosure, when a HARQ-ACK bit(s) corresponding to an (e.g., first) SPS PDSCH is deferred (e.g., indicated by a differed HARQ-ACK parameter included in the SPS configuration), there may be other HARQ-ACK bit(s) corresponding to another (e.g., a second) SPS PDSCH configured in the same slot. In some such implementations, the other HARQ-ACK bit(s) corresponding to the other SPS PDSCH of a same or different SPS configurations may be a non-deferred HARQ-ACK bit(s). An example of some such implementations may be illustrated in FIG. 3, which a schematic diagram illustrating deferring a HARQ-ACK transmission based on a PUCCH corresponding to multiple SPS PDSCHs of one or more SPS configurations.

Figure 3:
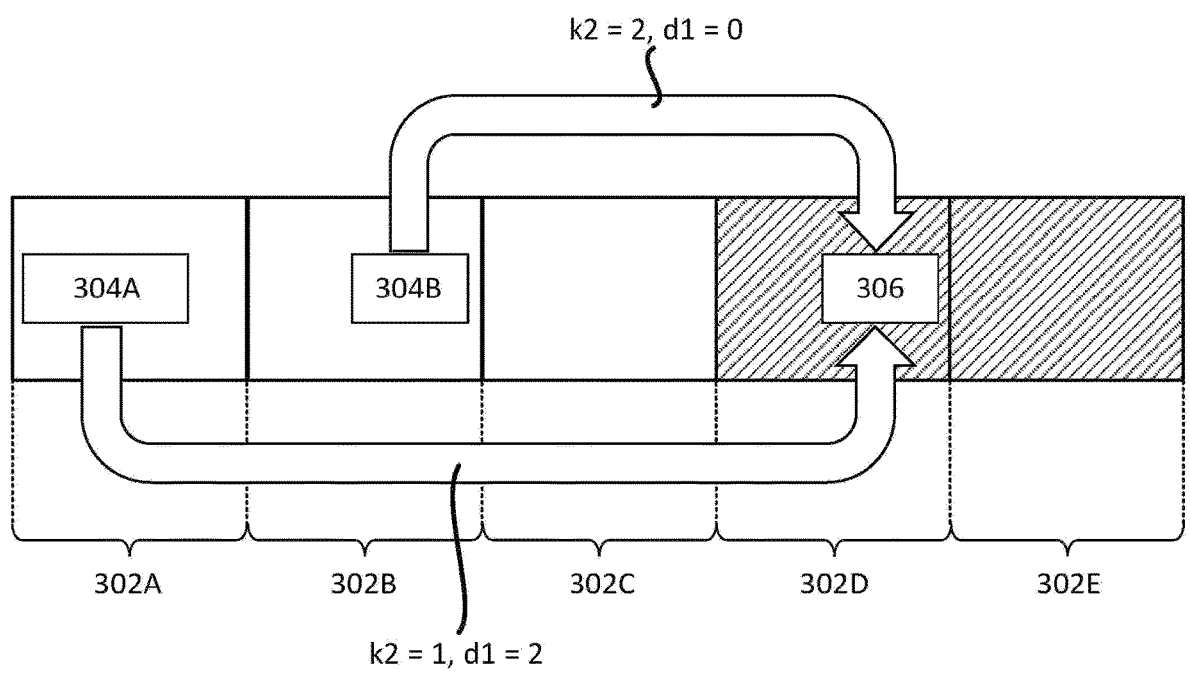
FIG. 3 is a schematic diagram illustrating deferring a HARQ-ACK transmission based on a PUCCH corresponding to multiple SPS PDSCHs of one or more SPS configurations, according to an example implementation of the present disclosure.

In some implementations, example slots, as illustrated in FIG. 3, may include a slot 302A (e.g., slot 0), a slot 302B (e.g., slot 1), a slot 302C (e.g., slot 2), a slot 302D (e.g., slot 3), and a slot 302E (e.g., slot 4). The slot 302A, slot 302B, and slot 302C may all be configured with one or more DL symbols (e.g., resulting in them becoming non-patterned slots) while the slot 302D, and the slot 302E may be both configured with one or more UL symbols (e.g., resulting in them becoming patterned slots). A first SPS PDSCH 304A of SPS configuration 1 may be transmitted in the slot 302A and a PUCCH for a HARQ-ACK corresponding to the first SPS PDSCH 304A of the SPS configuration 1 may be deferred to the slot 302D based on an offset k2=1 and another offset d1=2. In order words, a HARQ-ACK bit(s) corresponding to the first SPS PDSCH 304A of SPS configuration 1 in the slot 302A may be deferred to the slot 302D based on the offset k2=1 and the offset d1=2. A second SPS PDSCH 304B of SPS configuration 2 may be transmitted in the slot 302B and a PUCCH for a HARQ-ACK corresponding to the second SPS PDSCH 304B of SPS configuration 2 may be configured in the same slot 302D based on the offset k2=2 and the offset d1=0. In other words, a HARQ-ACK bit(s) corresponding to the second SPS PDSCH 304B of SPS configuration 2 in the slot 302B may be indicated to be transmitted 2 slots after the second SPS PDSCH 304B (e.g., in the same slot 302D) by a PDSCH-to-HARQ_feedback field in a corresponding activation DCI, based on the offset k2=2 and the offset d1=0.

As such, the deferred HARQ-ACK bit(s) corresponding to the first SPS PDSCH 304A of SPS configuration 1 and the non-deferred HARQ-ACK bit(s) corresponding to the second SPS PDSCHE 304B of SPS configuration 2 may be assigned to the same slot 302D. In some implementations, the UE may determine to transmit the deferred HARQ-ACK bit(s) corresponding to first SPS PDSCH 304A of SPS configuration 1 and the non-deferred HARQ-ACK bit(s) corresponding to the second SPS PDSCH 304B of SPS configuration 2 in the same slot 302D on a new PUCCH (e.g., PUCCH 306) that corresponds to the first SPS PDSCH 304A and the second SPS PDSCH 304B. In some such implementations, the UE may determine whether to transmit both the deferred and non-deferred HARQ-ACK bits on the third PUCCH 306 based on the payload sizes of the deferred HARQ-ACK and the non-deferred HARQ-ACK.

In some implementations, the new PUCCH resource (e.g., the third PUCCH 306) in the slot 302D may be determined based on a total payload size of the deferred and non-deferred HARQ-ACK bits. In some implementations, when the total payload size is below a threshold number of bits (e.g., 2 bits), the PUCCH resource may be the PUCCH resource configured in an SPS-PUCCH-AN-List with SPS-PUCCH-AN-ResourceID=0. In some implementations, when the total payload size is larger than the threshold number of bits and below a second threshold number of bits, the PUCCH resource may be the PUCCH resource configured in the SPS-PUCCH-AN-List with SPS-PUCCH-AN-ResourceID=1 In some implementations, when the total payload size is larger than the second threshold number of bits and below a third threshold number of bits, the PUCCH resource may be the PUCCH resource configured in the SPS-PUCCH-AN-List with SPS-PUCCH-AN-ResourceID=2. In some implementations, when the total payload size is larger than the third threshold number of bits and below a fourth threshold number of bits, e.g. 1706 bits, the PUCCH resource may be the PUCCH resource configured in the SPS-PUCCH-AN-List with SPS-PUCCH-AN-ResourceID=3. It is noted that the SPS-PUCCH-AN-List may or may not configure PUCCH resources with SPS-PUCCH-AN-ResourceID=1, SPS-PUCCH-AN-ResourceID=2, and SPS-PUCCH-AN-ResourceID=3. In some such implementations, if the total payload size is over the maximum allowable size (e.g., above the threshold number of bits), a BS may configure suitable SPS configurations and PUCCH resources such that a PUCCH resource that is capable of accommodating the deferred and the non-deferred HARQ-ACKs may always be available for the UE to transmit the deferred and non-deferred HARQ-ACKs.

Figure 4:
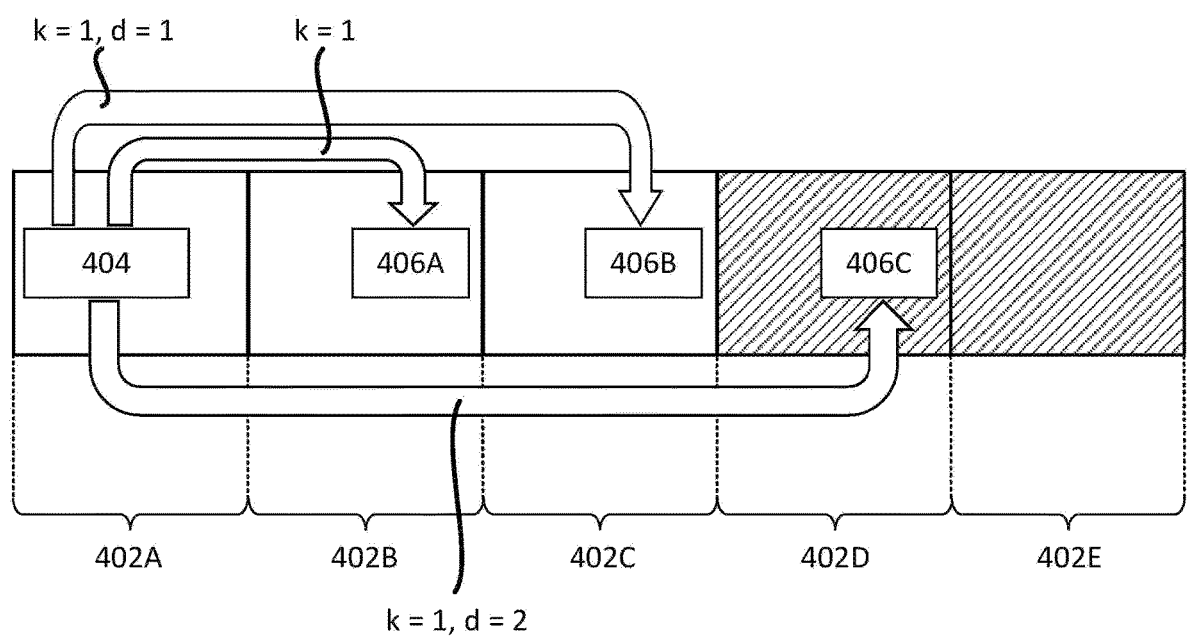
FIG. 4 is a schematic diagram illustrating deferring a HARQ-ACK transmission based on a PUCCH corresponding to an SPS PDSCH, according to another example implementation of the present disclosure.

As discussed above, in some implementations of the present disclosure, the offset "d" may be a value or multiple values chosen from a set of values. In some implementations, a maximum value in the value set may be preconfigured or predefined and the set of values may include all integers less than or equal to the maximum value. An example of such implementations may be illustrated in FIG. 4, which is a schematic diagram illustrating deferring a HARQ-ACK transmission based on a PUCCH corresponding to an SPS PDSCH, according to another example implementation of the present disclosure. In some implementations, example slots, as illustrated in FIG. 4, may include a slot 402A (e.g., slot 0), a slot 402B (e.g., slot 1), a slot 402C (e.g., slot 2), a slot 402D (e.g., slot 3), and a slot 402E (e.g., slot 4). The slot 402A, slot 402B, and slot 402C may all be configured with one or more DL symbols (e.g., resulting in them becoming non-patterned slots) while the slot 402D, and the slot 402E may both be configured with one or more UL symbols (e.g., resulting in them becoming patterned slots). In some implementations, the offset "d" may be a value in a set of values {0, 1, 2, 3}. An SPS PDSCH 404 may be transmitted in the slot 402A and a PUCCH (e.g., a first PUCCH) 406A for a HARQ-ACK corresponding to the SPS PDSCH 404 may be configured in the slot 402B based on an offset k=1. However, in some implementations, the first PUCCH 406A in the slot 402B may not be transmittable to the base station, for example, as the first PUCCH 406A collides with the DL symbol in the slot 402B (e.g., the first PUCCH 406A configured in the non-patterned slot 402B or the slot 402B with a DL symbol).

As such, the UE may not transmit the HARQ-ACK on the first PUCCH 406A in the slot 402B and may determine to transmit the HARQ-ACK on another PUCCH 406B (e.g., a second PUCCH) in the slot 402C based on the offset k=1 and another offset d=1. Furthermore, in some implementations, the second PUCCH 406B in the slot 402C may also collide with a DL symbol in the slot 402C (e.g., the second PUCCH 406B configured in the non-patterned slot 402C or the slot 402C with a DL symbol). In some implementations, the UE may iteratively inspect the subsequent slot(s) until the UE reaches a slot with a UL symbol(s) or a flexible symbol(s), or until the UE reaches a threshold number of inspection iteration. For example, when the first PUCCH 406A for a HARQ-ACK corresponding to the SPS PDSCH 404 collides with the a DL symbol(s) in slot 402B, the UE may iteratively inspect subsequent slots until the next available slot with a UL symbol(s) or flexible symbol(s) (e.g., slot 402D) is reached, or until the UE reaches a threshold number of inspection iteration (e.g., the UE may be configured with a threshold number of two inspection iterations which may allow the UE to only inspect two subsequent slots having an UL symbol(s) or flexible symbol(s) after the slot 402B). As such, the UE may further determine not to transmit the HARQ-ACK on the second PUCCH 406B in the slot 402C and determine to transmit the HARQ-ACK on a third PUCCH 406C in the slot 402D since the third PUCCH 406C may be transmittable to the base station, for example, as the third PUCCH 406C may not collide with a UL symbol (e.g., the third PUCCH 406C to be transmitted in the patterned slot 402D, or the slot 402D with a UL symbol) based on the offset k=1 and the other offset d=2.

In some implementations, the set of values may be an SPS configuration-specific configuration. In other words, the set of values may be different for different SPS configurations.

In some implementations, the maximum value of the offset "d" may be a number of slots of a multiple times of the periodicity of the SPS configuration of the SPS PDSCH reception. In some implementations, the maximum value of the offset "d" may be a value such that "k±d" is a number of slots of a multiple times of the periodicity of the SPS configuration of the SPS PDSCH reception.

In some implementations, the offset "d" may be a value determined based on a slot configuration tdd-UL-DL-ConfigurationDedicated or tdd-UL-DL-ConfigurationCommon and PUCCH resource related configurations (e.g., a PUCCH-Config and an SPS-Config or an SPS-PUCCH-AN-List-r16).

In some implementations, when there is only one SPS configuration that is configured, or when there is only one SPS configuration that is configured and activated, and when the UE is configured to monitor a DCI (e.g., DC format 2_0), the offset "d" may be the smallest value such that the symbols containing the PUCCH resource indicated by n1PUCCH-AN in SPS-Config or by SPS-PUCCH-AN-r16 in PUCCH-Config in the slot "n+k+d" may be indicated as uplink by a slot configuration tdd-UL-DL-ConfigurationDedicated or tdd-UL-DL-ConfigurationCommon. In some implementations, SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions.

In some implementations, when there is more than one SPS configurations that are configured or there is more than one SPS configurations that are configured and activated, and when the UTE is configured to monitor a DCI (e.g., DCI format 2_0), the offset "d" may be the smallest value such that the symbols containing the PUCCH resource indicated by SPS-PUCCH-AN-r16 in PUCCH-Config in the slot "n+k+d" may be indicated as uplink by a slot configuration tdd-UL-DL-ConfigurationDedicated or tdd-UL-DL-ConfigurationCommon. In some implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions.

In some implementations, when there is only one SPS configuration that is configured or there is only one SPS configuration that is configured and activated, and when the UE is not configured to monitor a DCI (e.g., DCI format 2_0), the offset "d" may be the smallest value such that the symbols containing the PUCCH resource indicated by n1PUCCH-AN in SPS-Config or by SPS-PUCCH-AN-r16 in PUCCH-Config in the slot "n+k+d" may be indicated as uplink or flexible by a slot configuration tdd-UL-DL-ConfigurationDedicated or tdd-UL-DL-ConfigurationCommon. In some implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions.

In some implementations, when there is more than one SPS configurations that are configured or there is more than one SPS configurations that are configured and activated, and when the UE is not configured to monitor a DCI (e.g., DCI format 2_0), the offset "d" may be the smallest value such, that the symbols containing the PUCCH resource indicated by SPS-PUCCH-AN-r16 in PUCCH-Config in the slot "n+k+d" may be indicated as uplink or flexible by a slot configuration tdd-UL-DL-ConfigurationDedicated or tdd-UL-DL-ConfigurationCommon. In some implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions.

In some implementations, when there is only one SPS configuration that is configured or there is only one SPS configuration that is configured and activated, and when the UE is configured to monitor a DCI (e.g., DCI format 2_0), the offset "d" may be the set of values such that the symbols containing the PUCCH resource indicated by n1PUCCH-AN in SPS-Config or by SPS-PUCCH-AN-r16 in PUCCH-Config in the slot "n+k+d" may be indicated as uplink or flexible by a slot configuration tdd-UL-DL-ConfigurationDedicated or tdd-UL-DL-ConfigurationCommon. In some implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by n1PUCCH-AN in the SPS-Config or by the SPS-PUCCH-AN-r16 in PUCCH-Config in the slot "n+k+d" may be indicated as uplink by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in, a second slot that is positioned after the first slot may be set to a NACK.

In some implementations, when there is more than one SPS configurations that are configured or there is more than one SPS configurations that are configured and activated, and when the UE is configured to monitor a DCI (e.g., DCI format 2_0), the offset "d" may be the set of values such that the symbols containing the PUCCH resource indicated by SPS-PUCCH-AN-r16 in PUCCH-Config in the slot "n+k+d" are indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the SPS-PUCCH-AN-r16 in the PUCCH-Config in the slot "n+k+d" may be indicated as uplink by a slot configuration tdd-UL-DL-ConfigurationDedicated or tdd-UL-DL-ConfigurationCommon. In some implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is after the first slot may be set to a NACK. In some such implementations, the HARQ-ACK bit(s) in the second slot may be regarded as deferred HARQ-ACK bit(s).

In some implementations, when there is only one SPS configuration that is configured or there is only one SPS configuration that is configured and activated, and when the UE is not configured to monitor a DCI (e.g., DCI format 2_0), the offset "d" may be a set of values such that the symbols containing one or more than one of the PUCCH resources indicated by n1PUCCH-AN in SPS-Config or by SPS-PUCCH-AN-r16 in PUCCH-Config and of the PUCCH resources overlapping with the PUCCH resource indicated by the n1PUCCH-AN in the SPS-Config or by the SPS-PUCCH-AN-r16 in the PUCCH-Config in the PUCCH resource sets that may be dynamically scheduled and may accommodate the SPS HARQ-ACK codebook in the slot "n+k+d" are indicated as uplink or flexible by a slot configuration tdd-UL-DL-ConfigurationDedicated or tdd-UL-DL-ConfigurationCommon. In some implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the n1PUCCH-AN in the SPS-Config or by the SPS-PUCCH-AN-r16 in the PUCCH-Config in the slot "n+k+d" may be indicated as uplink or flexible by a slot configuration tdd-UL-DL-ConfigurationDedicated or tdd-UL-DL-ConfigurationCommon. In some implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK.

In some implementations, when there is more than one SPS configurations that are configured or there is more than one SPS configurations that are configured and activated, and when the UE is not configured to monitor a DCI (e.g., DCI format 2_0), the offset "d" may be the set of values such that the symbols containing one or more than one of the PUCCH resources indicated by SPS-PUCCH-AN-r16 in PUCCH-Config and of the PUCCH resources overlapping with the PUCCH resource indicated by the SPS-PUCCH-AN-r16 in the PUCCH-Config in the PUCCH resource sets that may be dynamically scheduled and may accommodate the SPS HARQ-ACK codebook in the slot "n+k+d" are indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the SPS-PUCCH-AN-r16 in PUCCH-Config in the slot "n+k+d" may be indicated as uplink or flexible by a slot configuration tdd-UL-DL-ConfigurationDedicated or tdd-UL-DL-ConfigurationCommon. In some implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK. In some such implementations, the HARQ-ACK bit(s) in the second slot may be regarded as deferred HARQ-ACK bit(s).

In some implementations, when there is only one SPS configuration that is configured or there is only one SPS configuration that is configured and activated, and when the UE is configured to monitor a DCI (e.g., format 2_0), the offset "d" may be the set of values such that the symbols containing one or more than one of the PUCCH resources indicated by n1PUCCH-AN in SPS-Config or by SPS-PUCCH-AN-r16 in PUCCH-Config and of the PUCCH resources overlapping with the PUCCH resource indicated by the n1PUCCH-AN in the SPS-Config or by the SPS-PUCCH-AN-r16 in the PUCCH-Config in the PUCCH resource sets that may be dynamically scheduled and may accommodate the SPS HARQ-ACK codebook in the slot "n+k+d" may be indicated as uplink or flexible by a slot configurations tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the n1PUCCH-AN in the SPS-Config or by the SPS-PUCCH-AN-r16 in the PUCCH-Config in the slot "n+k+d" may be indicated as uplink by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK.

In some implementations, when there is more than one SPS configurations that are configured or there is more than one SPS configurations that are configured and activated, and when the UE is configured to monitor a DCI (e.g., DCI format 2_0), the offset "d" may be the set of values such that the symbols containing one or more than one of the PUCCH resources indicated by SPS-PUCCH-AN-r16 in PUCCH-Config and of the PUCCH resources overlapping with the PUCCH resource indicated by the SPS-PUCCH-AN-r16 in the PUCCH-Config in the PUCCH resource sets that may be dynamically scheduled and may accommodate the SPS HARQ-ACK codebook in the slot "n+k+d" may be indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the SPS-PUCCH-AN-r16 in the PUCCH-Config in slot n+k+d may be indicated as uplink by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK. In some such implementations, the HARQ-ACK bit(s) in the second slot may be regarded as deferred HARQ-ACK bit(s).

In some implementations, when there is only one SPS configuration that is configured or there is only one SPS configuration that is configured and activated, and when the UE is not configured to monitor a DCI (e.g., DCI format 2_0), the offset "d" may be the set of values such that the symbols containing one or more than one of the PUCCH resources indicated by n1PUCCH-AN in SPS-Config or by SPS-PUCCH-AN-r16 in PUCCH-Config. of the PUCCH resources overlapping with the PUCCH resource indicated by the n1PUCCH-AN in the SPS-Config or by the SPS-PUCCH-AN-r16 in the PUCCH-Config in the PUCCH resource sets that may be dynamically scheduled and may accommodate the SPS HARQ-ACK codebook, and of the PUCCH resources overlapping with the PUCCH resource indicated by the n1PUCCH-AN in the SPS-Config or by the SPS-PUCCH-AN-r16 in the PUCCH-Config that may be configured for CSI of the same priority as indicated by harq-CodebookID in the SPS-Config of the SPS PDSCH reception and may accommodate the SPS HARQ-ACK codebook in the slot "n+k+d" may be indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the n1PUCCH-AN in the SPS-Config or by the SPS-PUCCH-AN-r16 in the PUCCH-Config in the slot "n+k+d" may be indicated as uplink or flexible by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK.

In some implementations, when there is more than one SPS configurations that are configured or there is more than one SPS configurations that are configured and activated, and when the UE is not configured to monitor a DCI (e.g., DCI format 2_0), the offset "d" may be the set of values such that the symbols containing one or more than one of the PUCCH resources indicated by SPS-PUCCH-AN-r16 in PUCCH-Config. of the PUCCH resources overlapping with the PUCCH resource indicated by the SPS-PUCCH-AN-r16 in the PUCCH-Config in the PUCCH resource sets that may be dynamically scheduled and may accommodate the SPS HARQ-ACK codebook, and of the PUCCH resources overlapping with the PUCCH resource indicated by SPS-PUCCH-AN-r16 in PUCCH-Config that may be configured for CSI of the same priority as indicated by harq-CodebookID in the SPS-Config of the SPS PDSCH reception and may accommodate the SPS HARQ-ACK codebook in the slot "n+k+d" may be indicated as uplink or flexible by a slot configuration tdd-UL-DL-ConfigurationDedicated or tdd- UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of d may be a value such that all symbols containing the PUCCH resource indicated by the SPS-PUCCH-AN-r16 in the PUCCH-Config in the slot "n+k+d" may be indicated as uplink or flexible by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK. In some such implementations, the HARQ-ACK bit(s) in the second slot may be regarded as deferred HARQ-ACK bit(s).

In some implementations, when there is only one SPS configuration that is configured or there is only one SPS configuration that is configured and activated, and when the UE is configured to monitor a DCI (e.g., DCI format 2_0), the offset "d" may be the set of values such that the symbols containing one or more than one of the PUCCH resources indicated by n1PUCCH-AN in SPS-Config or by SPS-PUCCH-AN-r16 in PUCCH-Config, of the PUCCH resources overlapping with the PUCCH resource indicated by the n1PUCCH-AN in the SPS-Config or by the SPS-PUCCH-AN-r16 in the PUCCH-Config in the PUCCH resource sets that may be dynamically scheduled and may accommodate the SPS HARQ-ACK codebook, and of the PUCCH resources overlapping with the PUCCH resource indicated by n1PUCCH-AN in the SPS-Config or by the SPS-PUCCH-AN-r16 in the PUCCH-Config that are configured for CSI of the same priority as indicated by harq-CodebookID in the SPS-Config of the SPS PDSCH reception and may accommodate the SPS HARQ-ACK codebook in the slot "n+k+d" may be indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the n1PUCCH-AN in the SPS-Config or by the SPS-PUCCH-AN-r16 in the PUCCH-Config in the slot "n+k+d" may be indicated as uplink by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK.

In some implementations, when there is more than one SPS configurations that are configured or there is more than one SPS configurations that are configured and activated, and when the UE is configured to monitor a DCI (e.g., a DCI format 2_0), the offset "d" may be the set of values such that the symbols containing one or more than one of the PUCCH resources indicated by SPS-PUCCH-AN-r16 in PUCCH-Config, of the PUCCH resources overlapping with the PUCCH resource indicated by the SPS-PUCCH-AN-r16 in the PUCCH-Config in the PUCCH resource sets that may be dynamically scheduled and may accommodate the SPS HARQ-ACK codebook, and of the PUCCH resources overlapping with the PUCCH resource indicated by the SPS-PUCCH-AN-r16 in the PUCCH-Config that are configured for CSI of the same priority as indicated by harq-CodebookID in the SPS-Config of the SPS PDSCH reception and may accommodate the SPS HARQ-ACK codebook in the slot "n+k+d" are indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the SPS-PUCCH-AN-r16 in the PUCCH-Config in the slot "n+k+d" may be indicated as uplink by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK. In some such implementations, the HARQ-ACK bit(s) in the second slot may be regarded as deferred HARQ-ACK bit(s).

In some implementations, when there is only one SPS configuration that is configured or there is only one SPS configuration that is configured and activated, and when the UE is not configured to monitor a DCI (e.g., DCI format 2_0), the offset "d" may be the set of values such that the symbols containing one or more than one of the PUCCH resources indicated by n1PUCCH-AN in SPS-Config or by SPS-PUCCH-AN-r16 in PUCCH-Config and of the PUCCH resources in the PUCCH resource sets that may be dynamically scheduled and may accommodate the SPS HARQ-ACK codebook in the slot "n+k+d" may be indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the n1PUCCH-AN in the SPS-Config or by the SPS-PUCCH-AN-r16 in the PUCCH-Config in the slot "n+k+d" may be indicated as uplink or flexible by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK.

In some implementations, when there is more than one SPS configurations that are configured or there is more than one SPS configurations that are configured and activated, and when the UE is not configured to monitor a DCI (e.g., DCI format 2_0), the offset "d" may be the set of values such that the symbols containing one or more than one of the PUCCH resources indicated by SPS-PUCCH-AN-r16 in PUCCH-Config and of the PUCCH resources in the PUCCH resource sets that may be dynamically scheduled and may accommodate the SPS HARQ-ACK codebook in the slot "n+k+d" may be indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the SPS-PUCCH-AN-r16 in the PUCCH-Config in the slot "n+k+d" may be indicated as uplink or flexible by a slot configuration tdd-UL-DL-ConfigurationDedicated or tdd-UL-DL-ConfigurationCommon. If a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK. In some such implementations, the HARQ-ACK bit(s) in the second slot may be regarded as deferred HARQ-ACK bit(s).

In some implementations, when there is only one SPS configuration that is configured or there is only one SPS configuration that is configured and activated, and when the UE is configured to monitor a DCI (e.g., DCI format 2_0), the offset "d" may be the set of values such that the symbols containing one or more than one of the PUCCH resources indicated by n1PUCCH-AN in SPS-Config or by SPS-PUCCH-AN-r16 in PUCCH-Config and of the PUCCH resources in the PUCCH resource sets that may be dynamically scheduled and may accommodate the SPS HARQ-ACK codebook in the slot "n+k+d" are indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by n1PUCCH-AN in the SPS-Config or by the SPS-PUCCH-AN-r16 in PUCCH-Config in the slot "n+k+d" may be indicated as uplink by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK.

In some implementations, when there is more than one SPS configurations that are configured or there is more than one SPS configurations that are configured and activated, and when the UE is configured to monitor a DCI (e.g., DCI format 2_0) "d" is the set of values such that the symbols containing one or more than one of the PUCCH resources indicated by SPS-PUCCH-AN-r16 in PUCCH-Config and of the PUCCH resources in the PUCCH resource sets that may be dynamically scheduled and may accommodate the SPS HARQ-ACK codebook in the slot "n+k+d" are indicated as uplink or flexible by a slot configuration tdd-UL-DL-ConfigurationDedicated or tdd-UL-DL-ConfigurationCommon. In some such implementations, the SPS-PUCCH-AN-r16 may indicate the PUCCH: resource that may accommodate the deferred (or non-deferred) HARQ-ACK bit(s) corresponding to the SPS PDSCH reception and other deferred and non-deferred HARQ-ACK bits corresponding to other SPS PDSCH receptions. In some such implementations, the maximum value of the offset "d" may be a value such that all symbols containing the PUCCH resource indicated by the SPS-PUCCH-AN-r16 in PUCCH-Config in the slot "n+k+d" are indicated as uplink by a slot configuration tdd-UL-DL-ConfigurationDedicated or tdd-UL-DL-ConfigurationCommon. In some such implementations, if a HARQ-ACK bit(s) corresponding to an SPS PDSCH reception is reported in a first PUCCH provided for the HARQ-ACK bit(s) in a first slot, the HARQ-ACK bit(s) corresponding to the SPS PDSCH reception in a second PUCCH provided for the HARQ-ACK bit(s) in a second slot that is positioned after the first slot may be set to a NACK. In some such implementations, the HARQ-ACK bit(s) in the second slot may be regarded as deferred HARQ-ACK bit(s).

In some implementations, the maximum value of the offset "d" may be limited such that the value of "k+d" may be smaller than or equal to the maximum offset "K1" value in the dl-DataToUL-ACK in the first PUCCH-Config and in the second PUCCH-Config if the harq-CodebookID in SPS-Config of the SPS PDSCH reception indicates a low priority HARQ-ACK codebook and a high priority HARQ-ACK codebook, respectively. In some implementations, the above feature may be applicable when the type of the HARQ-ACK codebook of the same priority as indicated by harq-CodebookID in the SPS-Config of the SPS PDSCH reception is a Type-1 HARQ-ACK codebook, where the type of the HARQ-ACK is configured by pdsch-HARQ-ACK-CodebookList-r16. In some implementations, the above feature may be applicable when the type of the HARQ-ACK codebook of the same priority as indicated by harq-CodebookID in the SPS-Config of the SPS PDSCH reception is a Type-1 HARQ-ACK codebook or a Type-2 HARQ-ACK codebook, where the type of the HARQ-ACK is configured by pdsch-HARQ-ACK-CodebookList-r16.

In some implementations, when slot configurations tdd-UL-DL-ConfigurationDedicated and tdd-UL-DL-ConfigurationCommon are not configured, all symbols may be determined as flexible symbols or uplink symbols.

In some implementations, a sub-slot may be used instead of a slot for transmission of HARQ-ACK bit(s) of SPS PDSCH receptions of an SPS configuration if the harq-CodebookID in the SPS-Config indicates a priority, and the PUCCH-Config corresponding to the priority is configured with subslotLengthForPUCCH-r16. In some implementations, the first PUCCH-Config may correspond to the low priority and the second PUCCH-Config may correspond to the high priority.

In some implementations, whether or not a HARQ-ACK may be deferred, may be configured or indicated per SPS configuration by RRC configuration and/or by using activation DCI.

In some implementations, the PUCCH resource provided for SPS HARQ-ACK transmission(s) may be determined based on the payload size of the deferred and non-deferred HARQ-ACK bits.

In some implementations, the PUCCH resource provided for SPS HARQ-ACK transmission(s) may be determined based on the payload size of the non-deferred HARQ-ACK bit(s).

Figure 5:
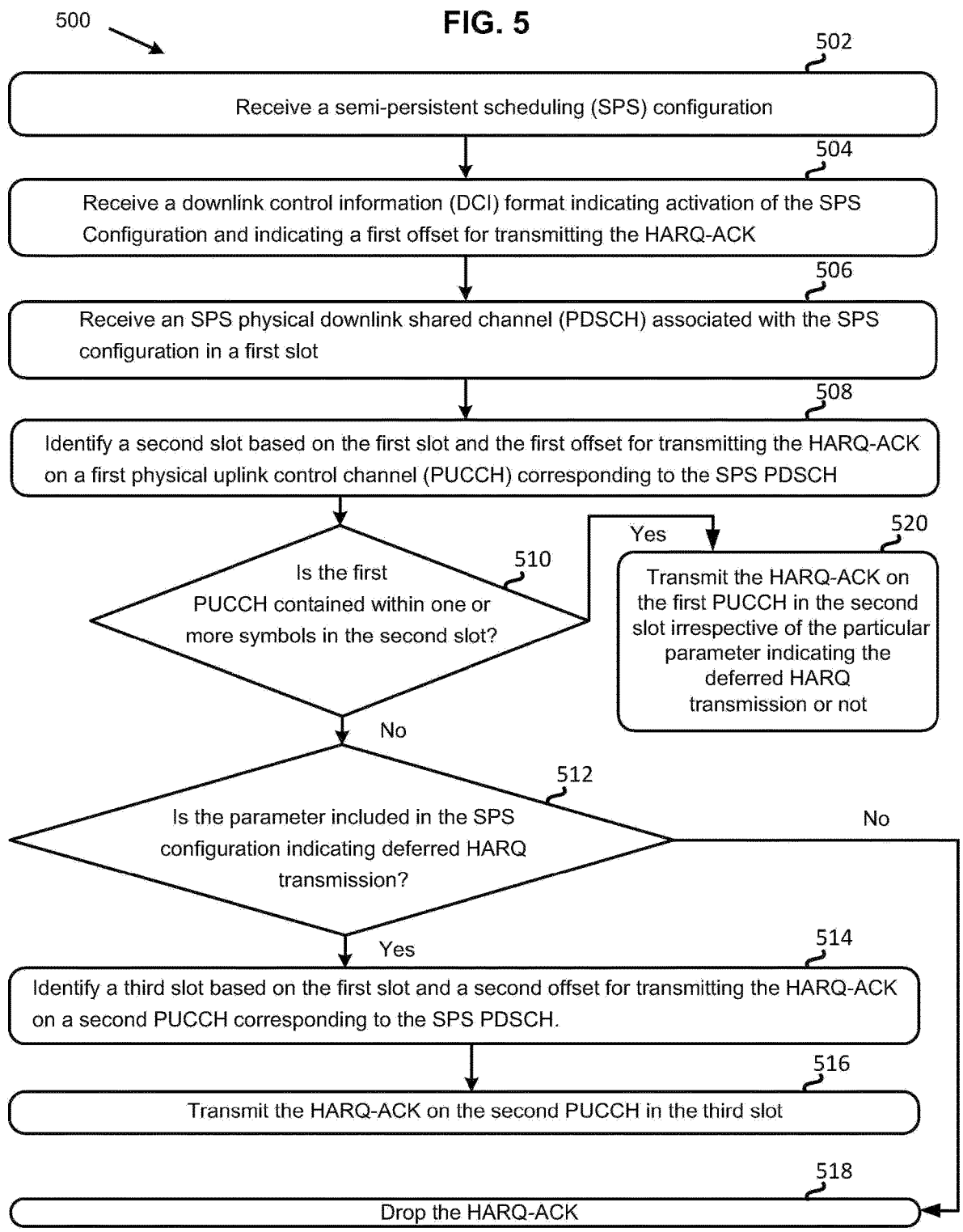
FIG. 5 is a flowchart illustrating a method for transmitting a HARQ-ACK by a UE, according to an example implementation of the present disclosure.

FIG. 5 is a flowchart illustrating a method/process for transmitting a HARQ-ACK by a UE, according to an example implementation of the present disclosure. As illustrated in FIG. 5, process 500 may start by receiving a semi-persistent scheduling (SPS) configuration in action 502. In some implementations, receiving the SPS configuration may include receiving the SPS configuration via radio resource control (RRC) signaling. After receiving the SPS configuration, process 500 may receive, in action 504, a downlink control information (DCI) format indicating activation of the SPS configuration. In some such implementations, the DCI format may further indicate a first offset (e.g., offset k) for transmitting the HARQ-ACK. In action 506, process 500 may further receive an SPS physical downlink shared channel (PDSCH) associated with the SPS configuration in a first slot (e.g., slot n).

After receiving the DCI format indicating the first offset, process 500 may identify, in action 508, a second slot (e.g., slot n+k) based on the first slot (e.g., slot n) and the first offset (e.g., k) for transmitting the HARQ-ACK on a first physical uplink control channel (PUCCH) corresponding to the SPS PDSCH. After identifying the second slot for transmitting the HARQ-ACK on the first PUCCH, the process may determine, in action 510, whether the first PUCCH is contained within one or more symbols in the second slot that are either uplink symbols or flexible symbols. In some implementations, when the first PUCCH is determined to be contained within the one or more symbols, the process 500 may proceed to action 520 which is described below. On the other hand, when the first PUCCH is determined not to be contained within the one or more symbols, the process 500 may proceed to action 512, which may further determine whether a particular parameter included in the SPS configuration indicates deferred HARQ transmission.

If the particular parameter included in the SPS configuration is determined to be indicating no deferred HARQ transmission (e.g., a bit representing the parameter is set to zero), the process 500 may proceed to action 518, which is described below. On the other hand, when the particular parameter included in the SPS configuration is determined to be indicating deferred HARQ transmission (e.g., the bit representing the parameter is set to one), the process 500 may identify, in action 514, a third slot (e.g., slot n+k+d) based on the first slot and a second offset (e.g., offset d) for transmitting the HARQ-ACK on a second PUCCH corresponding to the SPS PDSCH.

In some implementations, the second offset may be greater than the first offset (e.g., d>k) and the second PUCCH may be contained within one or more symbols in the third slot that are either uplink symbols or flexible symbols. In some such implementations, the one or more symbols in the third slot may be either semi static uplink symbols or semi static flexible symbols. In some implementations, the second offset may be determined based on identifying a particular slot earliest in time between the second slot and a maximum slot. In some such implementations, the particular slot may include enough number of uplink or flexible symbols for carrying the second PUCCH.

In some implementations, the second offset may be less than a maximum value which is also included in the SPS configuration.

In some implementations, after identifying the third slot for transmitting the HARQ-ACK on the second PUCCH, the process 500 may further transmit, in action 516, the HARQ-ACK on the second PUCCH in the third slot.

In some implementations, as described above, when the process 500 reaches action 510 and determines that the first PUCCH is not contained within the one or more symbols, the process 500 may proceed to action 512, which may further determine whether a particular parameter included in the SPS configuration is indicating a deferred HARQ transmission. If the particular parameter included in the SPS configuration is determined not to be indicating the deferred HARQ transmission, the process 500 may proceed to action 518 in which the UE may drop the HARQ-ACK.

In some implementations, as discussed above, when the process 500 reaches action 510 and determines that the first PUCCH is contained within the one or more symbols, the process 500 may proceed to action 520 in which the UE may transmit the HARQ-ACK on the first PUCCH in the second slot. In such a situation, the process 500 may transmit the HARQ-ACK on the first PUCCH in the second slot irrespective of the particular parameter indicating the deferred HARQ transmission or not. That is, when the first PUCCH is contained within the one or more symbols, the process 500 may not investigate the status of the particular parameter and transmit the HARQ-ACK on the first PUCCH in the second slot without knowing whether this parameter indicates a deferred transmission of HARQ or not.

Figure 6:
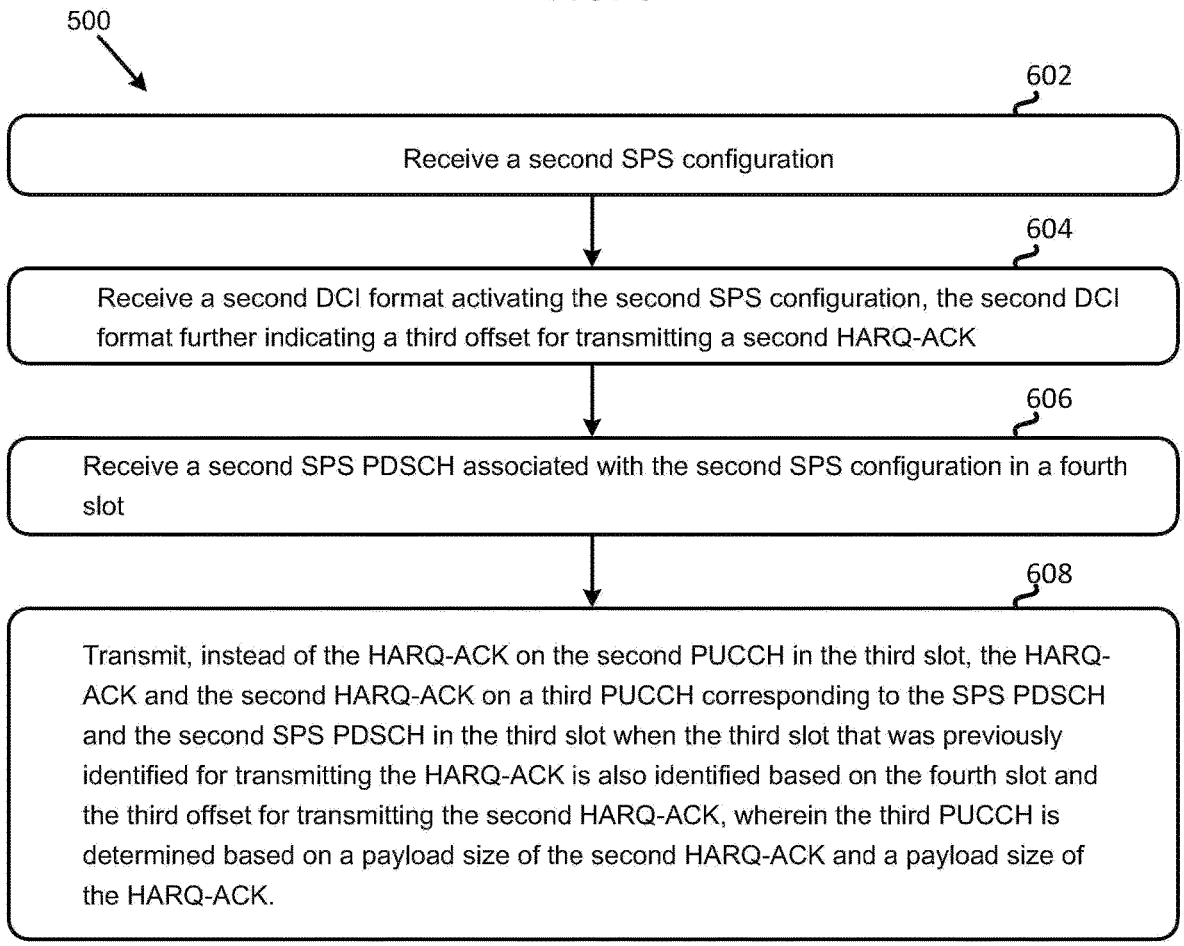
FIG. 6 is a flowchart further illustrating the method of FIG. 5, according to an example implementation of the present disclosure.

FIG. 6 is a flowchart further illustrating the method/process in FIG. 5, according to an example implementation of the present disclosure. In some implementations, after identifying the third slot for transmitting the HARQ-ACK on the second PUCCH corresponding to the SPS PDSCH, as shown in action 514 of FIG. 5, process 500 may proceed to action 602 (e.g., instead of proceeding to action 516 shown in FIG. 5). In action 602, process 500 may receive a second SPS configuration. After receiving the second SPS configuration in action 602, the process 500 may further receive, in action 604, a second DCI format activating the second SPS configuration. In some implementations, the second DCI format may further indicate a third offset for transmitting a second HARQ-ACK. The process 500 may further receive, in action 606, a second SPS PDSCH associated with the second SPS configuration in a fourth slot.

In some implementations, when the third slot that was identified for transmitting the HARQ-ACK in action 514 is also identified based on the fourth slot and the third offset for transmitting the second HARQ-ACK (e.g., the third slot identified for transmitting the HARQ-ACK in action 514 may be the same slot configured for transmitting the second HARQ-ACK), the process 500 may transmit, in action 608, the HARQ-ACK (e.g., in action 514) and the second HARQ-ACK (e.g., in action 604) on a third PUCCH corresponding to the SPS PDSCH and the second SPS PDSCH in the third slot instead of proceeding to action 516 in which the UE may transmit only the HARQ-ACK on the second PUCCH in the third slot. In some implementations, the third PUCCH may be determined based on a payload size of the second HARQ-ACK and a payload size of the HARQ-ACK.

As described above, the present disclosure may provide management of UE behavior of HARQ-ACK transmission for SPS PDSCH by HARQ-ACK codebook construction. Specifically, defining a size of a HARQ-ACK codebook of a PUCCH resource for transmission of only SPS HARQ- ACK bit(s) and the ordering of the SPS HARQ-ACK bit(s) may be necessary to construct a HARQ-ACK codebook. Constructing a HARQ-ACK codebook for a PUCCH resource provided for UE to report only SPS HARQ-ACK bit(s) may be achieved by some example implementations. For example, an example pseudocode, "m−n≤k+$d_{max}$,", may be used to construct a HARQ-ACK codebook for a PUCCH resource in a UL slot "m" provided for a UE to report only SPS HARQ-ACK bit(s). HARQ-ACK information of an SPS PDSCH reception in DL slots overlapping with a UL slot "n" may be multiplexed in the PUCCH resource in the UL slot "m". In some implementations, an offset "k" may be a number of UL slots indicated by the PDSCH-to-HARQ_feedback timing indicator field in a corresponding DCI format used for activation of the SPS configuration of the SPS PDSCH reception or provided by dl-DataToUL-ACK if the PDSCH-to-HARQ_feedback timing indicator field is not present in the DCI format, and an offset "$d_{max}$" may be the maximum number of UL slots that the HARQ-ACK information of the SPS PDSCH reception may be deferred. In some implementations, HARQ-ACK codebook construction may start from the earliest DL slot in a serving cell "c" in which an SPS PDSCH reception is configured (e.g., may correspond to $n_D$=0) and the corresponding HARQ-ACK information may be multiplexed in the PUCCH resource.

In some implementations, the pseudocode indicated in TABLE 1 below may be applicable.

TABLE 1

```
Set N_cells^DL to the number of serving cells configured to the UE
    Set N_c^SPS to the number of SPS PDSCH configuration configured to the UE for
serving cell c
Set N_c^DL to the number of DL slots for SPS PDSCH reception on serving cell c with HARQ-ACK
information that may be multiplexed on the PUCCH
    Set j = 0 – HARQ-ACK information bit index
    Set c = 0 – serving cell index: lower indexes correspond to lower RRC indexes
of corresponding cell
        while c < N_cells^DL
    Set s = 0 – SPS PDSCH configuration index: lower indexes correspond to lower
RRC indexes of corresponding SPS configurations
            while s < N_c^SPS
                Set n_D = 0 – slot index
                    while n_D < N_c^DL
                        if {
                            a UE is configured to receive an SPS PDSCH in slot n_D for
                            SPS PDSCH configuration s on serving cell c, excluding SPS
                            PDSCH that is not required to be received among overlapping
                            SPS PDSCHs, if any according to Clause 6 in TS 38.214, or
                            based on a UE capability for a number of PDSCH receptions
                            in a slot according to Clause 6 in TS 38.214, or due to
                            overlapping with a set of symbols indicated as uplink by a slot
                            configuration tdd-UL-DL-ConfigurationCommon or tdd-UL-
                            DL-ConfigurationDedicated, and
                        HARQ-ACK information for the SPS PDSCH is associated with the
PUCCH, and HARQ-ACK information may be multiplexed in the PUCCH resource
                        }
                        if UE has not reported HARQ-ACK information for the SPS PDSCH
reception
                            õ_j^ACK = HARQ-ACK information bit for this SPS PDSCH reception
                            j = j + 1;
                        else
                            õ_j^ACK = NACK
                            j = j + 1;
                        end if
                    end if
                    n_D = n_D + 1;
                end while
            s = s + 1;
        end while
        c = c + 1;
                    end while
```

In some implementations, the pseudocode indicated in TABLE 2 below may be applicable.

TABLE 2

```
Set N_cells^DL to the number of serving cells configured to the UE
    Set N_c^SPS to the number of SPS PDSCH configuration configured to the UE for
serving cell c
    Set N_c^DL to the number of DL slots for SPS PDSCH reception on serving cell c
with HARQ-ACK information that may be multiplexed on the PUCCH
    Set j = 0 – HARQ-ACK information bit index
    Set c = 0 – serving cell index: lower indexes correspond to lower RRC indexes
of corresponding cell
        while c < N_cells^DL
    Set s = 0 – SPS PDSCH configuration index: lower indexes correspond to
lower RRC indexes of corresponding SPS configurations
```

TABLE 2-continued

```
while s < N_c^SPS
    Set n_D = 0 - slot index
        while n_D < N_c^DL
            if {
                a UE is configured to receive an SPS PDSCH in slot n_D for
                SPS PDSCH configuration s on serving cell c, excluding SPS
                PDSCH that is not required to be received among overlapping
                SPS PDSCHs, if any according to Clause 6 in TS 38.214, or
                based on a UE capability for a number of PDSCH receptions
                in a slot according to Clause 6 in TS 38.214, or due to
                overlapping with a set of symbols indicated as uplink by tdd-
                UL-DL-ConfigurationCommon or by tdd-UL-DL-
                ConfigurationDedicated, and
                    HARQ-ACK information for the SPS PDSCH is associated
                with the PUCCH, and HARQ-ACK information may be
                multiplexed in the PUCCH resource
            }
                if UE has not reported HARQ-ACK information for the SPS
                PDSCH reception
                    õ_j^ACK = HARQ-ACK information bit for this SPS PDSCH
                reception
                    j = j + 1;
            end if
        end if
        n_D = n_D + 1;
    end while
    s = s + 1;
end while
c = c + 1;
end while
```

In some implementations, deferred HARQ-ACK bit(s) for a {SPS configuration index, serving cell index} may be appended after or prepended before non-deferred HARQ-ACK bit(s) for the {SPS configuration index, serving cell index}. In some implementations, the bit ordering for the deferred HARQ-ACK bit(s) may be in ascending order of DL slot per {SPS configuration index, serving cell index}, and then in ascending order of SPS configuration index per {serving cell index}, and then in ascending order of serving cell index.

In some implementations, deferred HARQ-ACK bit(s) for all {DL slots, SPS configuration index, serving cell index} may be appended after or prepended before non-deferred HARQ-ACK bit(s) for all {DL slots, SPS configuration index, serving cell index}. In some implementations, the bit ordering for the deferred HARQ-ACK bit(s) may be in ascending order of DL slot per {SPS configuration index, serving cell index}, and then in ascending order of SPS configuration index per {serving cell index}, and then in ascending order of serving cell index.

In some implementations, deferred HARQ-ACK bit(s) for a serving cell may be appended after or prepended before non-deferred HARQ-ACK bit(s) for the serving cell. In some implementations, the bit ordering for the deferred HARQ-ACK bit(s) may be in ascending order of DL slot per {SPS configuration index, serving cell index}, and then in ascending order of SPS configuration index per {serving cell index}. In some implementations, the bit ordering for the non-deferred HARQ-ACK bit(s) may be in ascending order of DL slot per {SPS configuration index, serving cell index}, and then in ascending order of SPS configuration index per {serving cell index}. In some implementations, the concatenated deferred HARQ-ACK bit(s) and non-deferred HARQ-ACK bit(s) of a serving cell are ordered in ascending order of serving cell index.

In some implementations, deferred HARQ-ACK bit(s) for a {DL slot, serving cell index} may be appended after or prepended before non-deferred HARQ-ACK bit(s) for the {DL slot, serving cell index}. In some implementations, the bit ordering for the deferred HARQ-ACK bit(s) may be in ascending order of SPS configuration index per {DL slot, serving cell index}, and then in ascending order of DL slot per {serving cell index}. In some implementations, the bit ordering for the non-deferred HARQ-ACK bit(s) may be in ascending order of SPS configuration index per {DL slot, serving cell index} and then in ascending order of DL lot per {serving cell index}. In some implementations, the concatenated deferred HARQ-ACK bit(s) and non-deferred HARQ-ACK bit(s) of a {DL slot, serving cell index} are ordered in ascending order of serving cell index.

In some implementations, the pseudocode indicated in TABLE 3 below may be applicable.

TABLE 3

```
Set N_cells^DL to the number of serving cells configured to the U
Set N_c^SPS to the number of SPS PDSCH configuration configured to the UE for
serving cell c
Set N_c^DL to the number of DL slots for SPS PDSCH reception on serving cell c
with HARQ-ACK information that may be multiplexed on the PUCCH
Set j = 0 - HARQ-ACK information bit index
Set c = 0 - serving cell index: lower indexes correspond to lower RRC indexes
of corresponding cell
    while c < N_cells^DL
        Set n_D = 0 - slot index
```

TABLE 3-continued

```
        while n_D < N_c^DL
            Set s = 0 - SPS PDSCH configuration index: lower indexes
        correspond to lower RRC indexes of corresponding SPS configurations
                while s < N_c^SPS
                    if {
                        a UE is configured to receive an SPS PDSCH in slot n_D for SPS
                    PDSCH configuration s on serving cell c, excluding SPS PDSCH that is
                    not required to be received among overlapping SPS PDSCHs, if any
                    according to Clause 6 in TS 38.214, or based on a UE capability for a
                    number of PDSCH receptions in a slot according to Clause 6 in TS
                    38.214, or due to overlapping with a set of symbols indicated as
                    uplink by a slot configuration tdd-UL-DL-ConfigurationCommon or
                    tdd-UL-DL-ConfigurationDedicated, and
                        HARQ-ACK information for the SPS PDSCH is associated with the
                    PUCCH, and HARQ-ACK information may be multiplexed in the
                    PUCCH resource
                    }
                    if the HARQ-ACK information is a deferred HARQ-ACK
                    information
                        if UE has not reported HARQ-ACK information for the SPS
                    PDSCH reception
                            õ_j^ACK = HARQ-ACK information bit for this SPS PDSCH
                        reception
                            j = j + 1;
                        else
                            õ_j^ACK = NACK
                            j = j + 1;
                        end if
                    end if
                end if
                s = s + 1;
            end while
            Set s = 0
            while s < N_c^SPS
                if {
                    a UE is configured to receive an SPS PDSCH in slot n_D for SPS PDSCH
                    configuration s on serving cell c, excluding SPS PDSCH that is not
                    required to be received among overlapping SPS PDSCHs, if any
                    according to Clause 6 in TS 38.214, or based on a UE capability for a
                    number of PDSCH receptions in a slot according to Clause 6 in TS 38.214,
                    or due to overlapping with a set of symbols indicated as uplink by a slot
                    configuration tdd-UL-DL-ConfigurationCommon or tdd-UL-DL-
                    ConfigurationDedicated, and
                        HARQ-ACK information for the SPS PDSCH is associated with the
                    PUCCH, and HARQ-ACK information may be multiplexed in the PUCCH
                    resource
                }
                if the HARQ-ACK information is not a deferred HARQ-ACK
                information
                    if UE has not reported HARQ-ACK information for the SPS PDSCH
                    reception
                        õ_j^ACK = HARQ-ACK information bit for this SPS PDSCH reception
                        j = j + 1;
                    end if
                end if
            end if
            s = s + 1;
        end while
        n_D = n_D + 1;
    end while
    c = c + 1;
end while
```

In some implementations, when the total payload size of the deferred and non-deferred SPS HARQ-ACK bits exceeds the maxPayloadSize of the PUCCH resource provided for the SPS HARQ-ACK bits or a dynamically scheduled PUCCH resource in which the SPS HARQ-ACK bits are multiplexed or may result in a code rate for a total number of HARQ-ACK bits higher than the maximum code rate of the PUCCH resource, dropping of some deferred SPS HARQ-ACK bit(s) may be performed.

In some implementations, when the total payload size of the deferred and non-deferred SPS HARQ-ACK bits exceeds the maxPayloadSize of the PUCCH resource provided for the SPS HARQ-ACK bits and the PUCCH resource is determined based on the total payload size of the non-deferred SPS HARQ-ACK bit(s), dropping of some deferred SPS HARQ-ACK bit(s) may be performed.

In some implementations, dropping of deferred SPS HARQ-ACK bit(s) may be in ascending order of DL slot number per {SPS configuration index, serving cell index} of the corresponding SPS PDSCH receptions, and/or in descending order of SPS configuration index per serving cell index, and/or in descending order of serving cell index.

As described above, the present disclosure may provide management of UE behavior of HARQ-ACK transmission for SPS PDSCH by multiplexing PUCCH for SPS HARQ-ACK only and other PUCCHs or PUSCHs.

In some implementations, defining the manner/mechanism(s) to multiplex the SPS HARQ-ACK bit(s) and the UCIs of the overlapping PUCCHs may be necessary when a PUCCH resource for transmission of only SPS HARQ-ACK bit(s) overlaps with other PUCCHs or PUSCHs.

In some implementations, when a PUCCH resource is provided for SPS HARQ-ACK only transmission, and the symbols containing the PUCCH resource are indicated as uplink or flexible by a slot configuration tdd-UL-DL-ConfigurationCommon or by tdd-UL-DL-ConfigurationDedicated, the PUCCH resource may be included in a resource set "Q" for a group of PUCCH resources of the same priority as indicated by harq-CodebookID in the SPS-Config(s) of the SPS PDSCH reception(s) corresponding to the SPS HARQ-ACK bit(s). In some implementations, UCI multiplexing procedure may be performed as specified in Clause 9.2.5 in TS 38.213 V15.3.0.

In some implementations, for a serving cell c, when UCI multiplexing procedure results in SPS HARQ-ACK bit(s) being multiplexed in a dynamically scheduled PUCCH resource for transmission of a HARQ-ACK codebook, and if the HARQ-ACK codebook is a Type-1 HARQ-ACK codebook, an SPS HARQ-ACK bit(s) may be reported in the HARQ-ACK bit(s) of the Type-1 HARQ-ACK codebook if the SPS PDSCH reception corresponding to the SPS HARQ-ACK bit(s) is within the $M_{A,c}$ occasions for candidate PDSCH receptions corresponding to the HARQ-ACK bit(s) of the Type-1 HARQ-ACK codebook as specified in Clause 9.1.2.1 in TS 38.213 V15.3.0. In some implementations, an SPS HARQ-ACK bit(s) may not be reported in the HARQ-ACK bit(s) of the Type-1 HARQ-ACK codebook if the SPS PDSCH reception corresponding to the SPS HARQ-ACK bit(s) is not within the $M_{A,c}$ occasions for candidate PDSCH receptions corresponding to the HARQ-ACK bit(s) of the Type-1 HARQ-ACK codebook.

In some implementations, a Type-1 HARQ-ACK codebook in a dynamically scheduled PUCCH resource may be extended if there is SPS HARQ-ACK bit(s) containing deferred SPS HARQ-ACK bit(s) that may be multiplexed in the PUCCH resource, and the number of deferred slots "d" may cause "k+d" to be larger than the maximum value of offset "k". In some implementations, "k" may be a number of slots indicated by the PDSCH-to-HARQ_feedback timing indicator field in a corresponding DCI format used for activation of the SPS configuration of the SPS PDSCH reception or provided by dl-DataToUL-ACK if the PDSCH-to-HARQ_feedback timing indicator field is not present in the DCI format. In some implementations, the maximum value of "k" is the maximum value configured in dl-DataToUL-ACK. In some implementations, an extra number of HARQ-ACK bit(s) may be prepended or appended to the Type-1 HARQ-ACK codebook, the number of HARQ-ACK bit(s) may be the number of occasions for candidate PDSCH receptions in the slots in which there are corresponding SPS PDSCH receptions for the deferred SPS HARQ-ACK bit(s), and the SPS PDSCH receptions may not be within the $M_{A,c}$ occasions for candidate PDSCH receptions corresponding to the HARQ-ACK bit(s) of the Type-1 HARQ-ACK codebook.

In some implementations, the Type-1 HARQ-ACK codebook may be extended for the candidate PDSCH receptions in a number of slots which may be preconfigured or predefined. In some implementations, the extended number of slots is in units of DL slots. For example, when the maximum deferred UL slots results in "k+d" being larger than the maximum value of "k" by "X" UL slots, the extended number of DL slots may be equal to or less than $$\frac{2^{\mu_{DL}}}{2^{\mu_{UL}}} \cdot X$$

slots. In some implementations, parameter(s) PDSCH-CodeBlockGroupTransmission and/or maxNrofCodeWordsScheduledByDCI may be considered to be not configured for determining the number of HARQ-ACK bit(s) for the extended number of DL slots.

In some implementations, when UCI multiplexing procedure results in SPS HARQ-ACK bit(s) being multiplexed in a dynamically scheduled PUCCH resource for transmission of a HARQ-ACK codebook, and if the HARQ-ACK codebook is a Type-2 HARQ-ACK codebook, the SPS HARQ-ACK bit(s) may be reported by appending the SPS HARQ-ACK bit(s) to the Type-2 HARQ-ACK codebook.

In some implementations, when SPS HARQ-ACK bit(s) is multiplexed in a Type-1 HARQ-ACK codebook or a Type-2 HARQ-ACK codebook of a dynamically scheduled PUCCH and the PUCCH overlaps with a PUSCH in a slot, the SPS HARQ-ACK bit(s) may be multiplexed in the PUSCH in the slot. When SPS HARQ-ACK bit(s) is not multiplexed in a Type-1 HARQ-ACK codebook or a Type-2 HARQ-ACK codebook of a dynamically scheduled PUCCH in a slot, and the PUCCH configured for transmission of only SPS HARQ-ACK bit(s) overlaps with a PUSCH in the slot, the SPS HARQ-ACK bit(s) may be multiplexed in the PUSCH in the slot.

Figure 7:
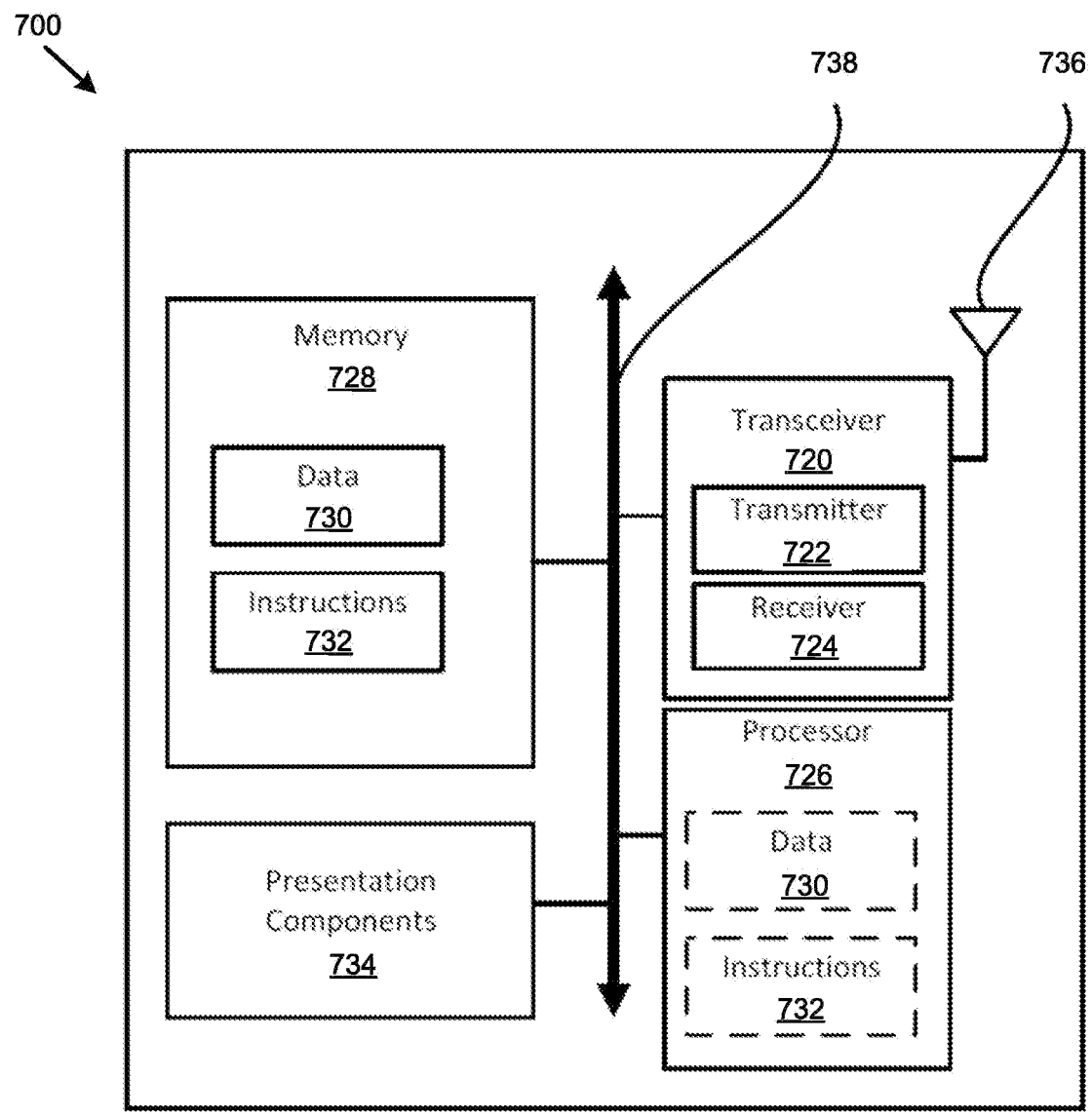
FIG. 7 is a block diagram illustrating a node for wireless communication, according to an example implementation of the present disclosure.

In some implementations of the present disclosure, the method and functions described with reference to FIGS. 1-6 may be implemented in a node. FIG. 7 is a block diagram illustrating a node 700 for wireless communication, according to one example implementation of the present disclosure. As shown in FIG. 7, the node 700 may include a transceiver 720, a processor 726, a memory 728, one or more presentation components 734, and at least one antenna 736. The node 700 may also include a Radio Frequency (RF) spectrum band module, a base station communications module, a network communications module, and a system communications management module, input/output (I/O) ports, I/O components, and a power supply (not explicitly shown in FIG. 7) in which each of the components above may be in communication with each other, directly or indirectly, over one or more buses 738.

The transceiver 720 may include a transmitter 722 and a receiver 724 configured to transmit and/or receive time and/or frequency resource partitioning information. In some implementations, the transceiver 720 may be configured to transmit in different types of subframes and slots including, but not limited to, usable, non-usable and flexibly usable subframes and slot formats. The transceiver 720 may be configured to receive data and control signaling.

The node 700 may include a variety of computer-readable media. Computer-readable media may be any available media accessible by the node 700 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules or other data.

Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media may embody computer-readable instructions, data structures, program modules or other data in a modulated data signal such as a carrier wave or other transport mechanism and includes any information delivery media. The term "modulated data signal" may be a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 728 may include computer-storage media in the form of volatile and/or non-volatile memory. The memory 728 may be removable, non-removable, or a combination thereof. Exemplary memory may include solid-state memory, hard drives, optical-disc drives, etc. As illustrated in FIG. 7, the memory 728 may store computer-readable, computer-executable instructions 732 (e.g., software codes) that are configured to, when executed, cause the processor 726 to perform various functions described herein, for example, with reference to FIGS. 2 through 6. Alternatively, instructions 732 may not be directly executable by the processor 726 but be configured to cause the node 700 (e.g., when compiled and executed) to perform various functions described herein.

The processor 726 may include an intelligent hardware device, for example, a central processing unit (CPU), a microcontroller, an ASIC, etc. The processor 726 may include memory. The processor 726 may process data 730 and instructions 732 received from the memory 728, and information through the transceiver 720, the base band communications module, and/or the network communications module. The processor 726 may also process information to be sent to the transceiver 720 for transmission through the antenna 736, and further to the network communications module for transmission to a core network.

The one or more presentation components 734 may present data indications to a person or other device. For example, the one or more presentation components 734 may include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method for transmitting a Hybrid Automatic Repeat Request (HARQ)-Acknowledgement (ACK) by a user equipment (UE), the method comprising:
   receiving a semi-persistent scheduling (SPS) configuration;
   receiving a downlink control information (DCI) format indicating activation of the SPS configuration, the DCI format further indicating a first offset for transmitting a first HARQ-ACK;
   receiving an SPS physical downlink shared channel (PDSCH) associated with the SPS configuration in a first slot;
   identifying a second slot based on the first slot and the first offset for transmitting the first HARQ-ACK on a first physical uplink control channel (PUCCH) corresponding to the SPS PDSCH;
   determining whether the first PUCCH is contained within one or more symbols in the second slot that are either uplink symbols or flexible symbols;
   in response to determining that the first PUCCH is not contained within the one or more symbols in the second slot and a particular parameter included in the SPS configuration indicates a deferred HARQ transmission:
      identifying a third slot based on the first slot and a second offset for transmitting the first HARQ-ACK on a second PUCCH corresponding to the SPS PDSCH, wherein the second offset is greater than the first offset and the second PUCCH is contained within one or more symbols in the third slot that are either uplink symbols or flexible symbols, and
      transmitting the first HARQ-ACK on the second PUCCH in the third slot;
   in response to determining that the first PUCCH is not contained within the one or more symbols in the second slot and the particular parameter does not indicate the deferred HARQ transmission, dropping the first HARQ-ACK;
   receiving a second SPS configuration;
   receiving a second DCI format activating the second SPS configuration, the second DCI format further indicating a third offset for transmitting a second HARQ-ACK;
   receiving a second SPS PDSCH associated with the second SPS configuration in a fourth slot; and
   in response to determining that the third slot that was previously identified for transmitting the first HARQ-ACK is also identified based on the fourth slot and the third offset for transmitting the second HARQ-ACK, transmitting, instead of the first HARQ-ACK on the second PUCCH in the third slot, the first HARQ-ACK and the second HARQ-ACK on a third PUCCH corresponding to the SPS PDSCH and the second SPS PDSCH in the third slot, wherein the third PUCCH is determined based on a payload size of the second HARQ-ACK and a payload size of the first HARQ-ACK.

2. The method of claim 1, wherein the one or more symbols in the third slot are either semi static uplink symbols or semi static flexible symbols.

3. The method of claim 1, wherein receiving the SPS configuration comprises receiving the SPS configuration via radio resource control (RRC) signaling.

4. The method of claim 1, wherein the second offset is less than a maximum value that is included in the SPS configuration.

5. The method of claim 1, further comprising, in response to determining that the first PUCCH is contained within the one or more symbols in the second slot, transmitting the first HARQ-ACK on the first PUCCH in the second slot irrespective of the particular parameter indicating the deferred HARQ transmission or not.

6. The method of claim 1, wherein the second offset is determined based on identifying a particular slot earliest in time between the second slot and a maximum slot, wherein the particular slot includes enough number of uplink or flexible symbols for carrying the second PUCCH.

7. A user equipment (UE), comprising:
one or more non-transitory computer-readable media storing one or more computer-executable instructions for transmitting a Hybrid Automatic Repeat Request (HARQ)-Acknowledgement (ACK); and
at least one processor coupled to the one or more non-transitory computer-readable media, and configured to execute the one or more computer-executable instructions to:
receive a semi-persistent scheduling (SPS) configuration;
receive a downlink control information (DCI) format indicating activation of the SPS configuration, the DCI format further indicating a first offset for transmitting a first HARQ-ACK;
receive an SPS physical downlink shared channel (PDSCH) associated with the SPS configuration in a first slot;
identify a second slot based on the first slot and the first offset for transmitting the first HARQ-ACK on a first physical uplink control channel (PUCCH) corresponding to the SPS PDSCH;
determine whether the first PUCCH is contained within one or more symbols in the second slot that are either uplink symbols or flexible symbols;
in response to determining that the first PUCCH is not contained within the one or more symbols in the second slot and a particular parameter included in the SPS configuration indicates a deferred HARQ transmission:
identify a third slot based on the first slot and a second offset for transmitting the first HARQ-ACK on a second PUCCH corresponding to the SPS PDSCH, wherein the second offset is greater than the first offset and the second PUCCH is contained within one or more symbols in the third slot that are either uplink symbols or flexible symbols, and
transmit the first HARQ-ACK on the second PUCCH in the third slot;
in response to determining that the first PUCCH is not contained within the one or more symbols in the second slot and the particular parameter does not indicate the deferred HARQ transmission, drop the first HARQ-ACK;
receive a second SPS configuration;
receive a second DCI format activating the second SPS configuration, the second DCI format further indicating a third offset for transmitting a second HARQ-ACK;
receive a second SPS PDSCH associated with the second SPS configuration in a fourth slot; and
in response to determining that the third slot that was previously identified for transmitting the first HARQ-ACK is also identified based on the fourth slot and the third offset for transmitting the second HARQ-ACK, transmit, instead of the first HARQ-ACK on the second PUCCH in the third slot, the first HARQ-ACK and the second HARQ-ACK on a third PUCCH corresponding to the SPS PDSCH and the second SPS PDSCH in the third slot, wherein the third PUCCH is determined based on a payload size of the second HARQ-ACK and a payload size of the first HARQ-ACK.

8. The UE of claim 7, wherein the one or more symbols in the third slot are either semi static uplink symbols or semi static flexible symbols.

9. The UE of claim 7, wherein receiving the SPS configuration comprises receiving the SPS configuration via radio resource control (RRC) signaling.

10. The UE of claim 7, wherein the second offset is less than a maximum value that is included in the SPS configuration.

11. The UE of claim 7, wherein the at least one processor is further configured to execute the one or more computer-executable instructions to, in response to determining that the first PUCCH is contained within the one or more symbols in the second slot, transmit the first HARQ-ACK on the first PUCCH in the second slot irrespective of the particular parameter indicating the deferred HARQ transmission or not.

12. The UE of claim 7, wherein the second offset is determined based on identifying a particular slot earliest in time between the second slot and a maximum slot, wherein the particular slot includes enough number of uplink or flexible symbols for carrying the second PUCCH.

* * * * *